United States Patent
Roh et al.

(10) Patent No.: US 7,965,798 B2
(45) Date of Patent: Jun. 21, 2011

(54) ROBUST PACKET DETECTION, SYMBOL TIMING, CHANNEL LENGTH ESTIMATION AND CHANNEL RESPONSE ESTIMATION FOR WIRELESS SYSTEMS

(75) Inventors: June Chul Roh, Santa Clara, CA (US); Anuj Batra, Dallas, TX (US); Manoneet Singh, Santa Clara, CA (US); Jaiganesh Balakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 980 days.

(21) Appl. No.: 11/893,050

(22) Filed: Aug. 13, 2007

(65) Prior Publication Data
US 2009/0028220 A1    Jan. 29, 2009

Related U.S. Application Data

(60) Provisional application No. 60/822,587, filed on Aug. 16, 2006.

(51) Int. Cl.
*H04L 27/06* (2006.01)
(52) U.S. Cl. ........................................................ 375/343
(58) Field of Classification Search .................. 375/142, 375/143, 150, 152, 343; 704/216, 218, 237, 704/263; 708/5, 422, 813; 342/108, 145, 342/189, 378; 370/342, 218, 473, 497; 455/3.02, 455/3.05
See application file for complete search history.

(56) References Cited

U.S. PATENT DOCUMENTS

| 6,697,350 | B2 | 2/2004 | Lomp |
| 6,904,566 | B2 | 6/2005 | Feler et al. |
| 2006/0007986 | A1* | 1/2006 | Larsson ........................ 375/130 |
| 2007/0014286 | A1 | 1/2007 | Lai |

OTHER PUBLICATIONS

PCT International Search Report; PCT/US07/76129 dated Mar. 19, 2008.
Jan-Jaap Van De Beek et al., On Channel Estimation in OFDM Systems, In Proceedings of Vehicular Technology Conference, vol. 2, pp. 815-819, Chicago, USA, Sep. 1995.
William Abbott et al., Multiband OFDM Physical Layer Specification, version 1.2, Feb. 22, 2007, MBOA, Special Interest Group.

* cited by examiner

*Primary Examiner* — Sam K Ahn
(74) *Attorney, Agent, or Firm* — Steven A. Shaw; W. James Brady; Frederick J. Telecky, Jr.

(57) ABSTRACT

A method. The method includes producing a first signal match indication based on at least one match indication indicative of a match between at least one signal received in at least one band and a reference signal. The method also includes producing a first signal multipath combined signal based upon the first signal match indication, and detecting a first peak in the first multipath combined signal.

22 Claims, 15 Drawing Sheets

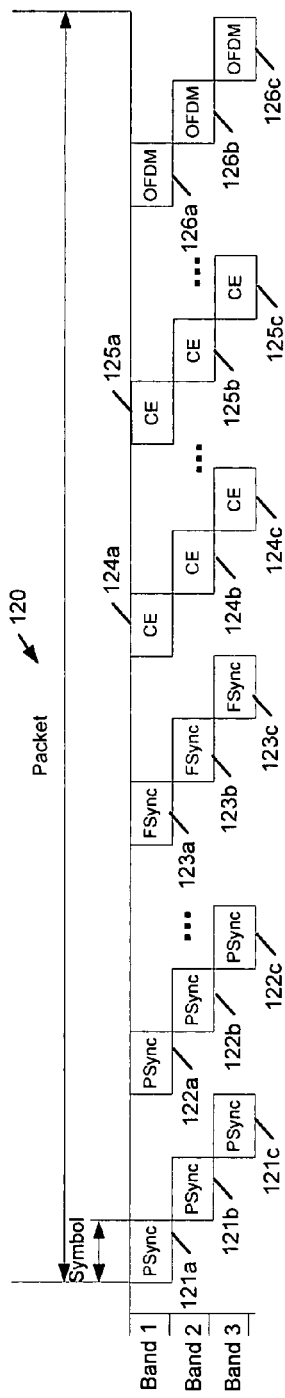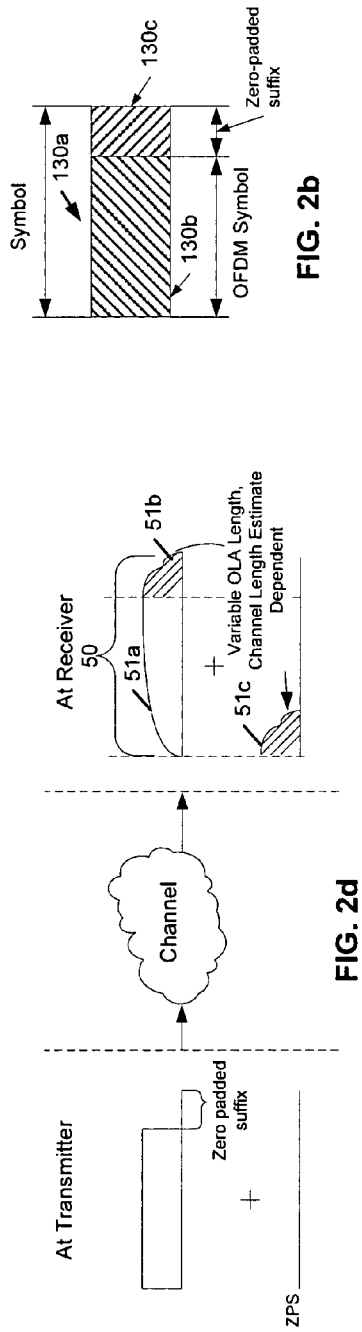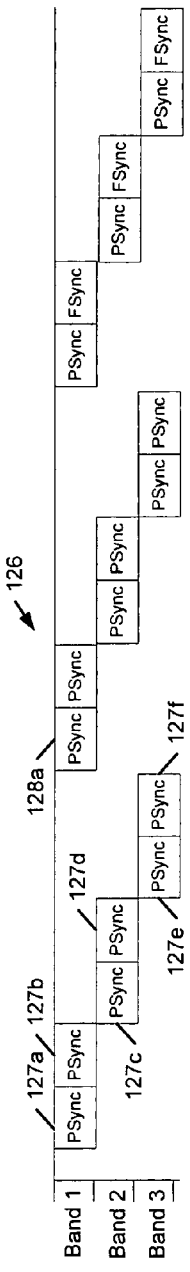
FIG. 2a
FIG. 2b
FIG. 2c
FIG. 2d

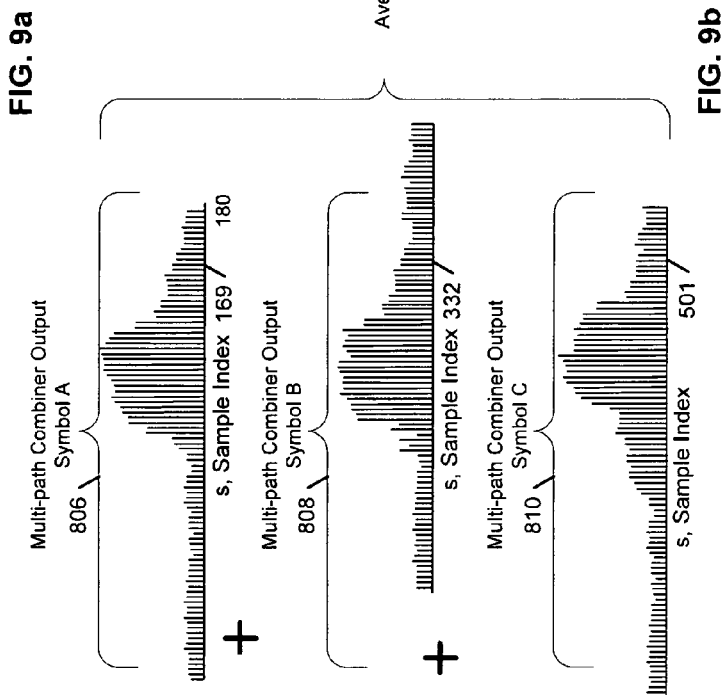
FIG. 9a
FIG. 9b

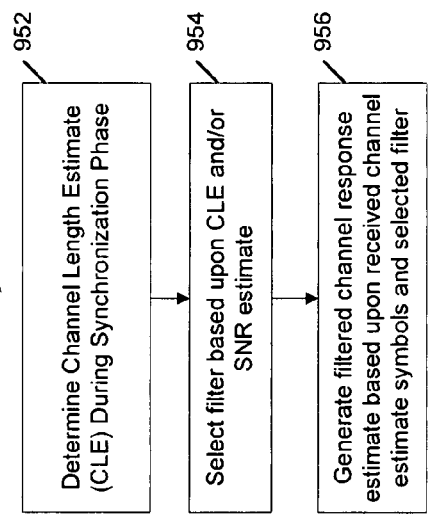
FIG. 12c
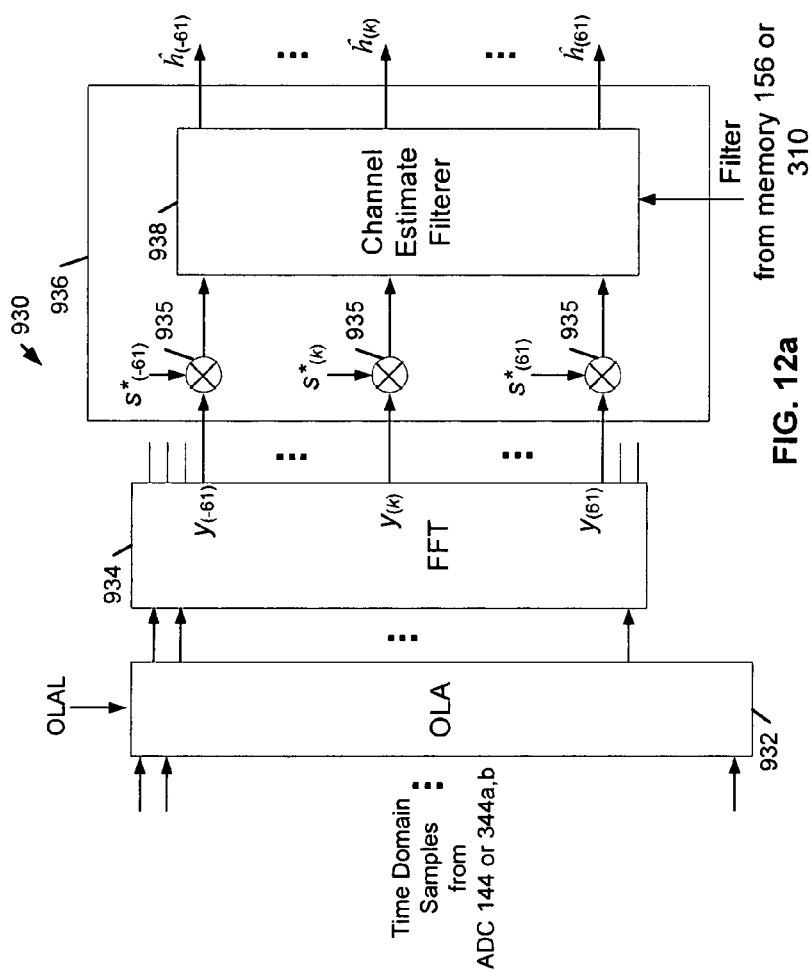
FIG. 12a
FIG. 12b

ROBUST PACKET DETECTION, SYMBOL TIMING, CHANNEL LENGTH ESTIMATION AND CHANNEL RESPONSE ESTIMATION FOR WIRELESS SYSTEMS

CROSS REFERENCE TO OTHER PATENT APPLICATIONS

This application claims priority to U.S. Provisional Patent Application No. 60/822,587, entitled ROBUST CODE ACQUISITION AND SYMBOL TIMING FOR WIRELESS SYSTEMS WITH DIVERSITY, filed Aug. 16, 2006 which is incorporated herein by reference.

BACKGROUND INFORMATION

In some communications systems a transmitter transmits a packet with a preamble that includes synchronization symbols and other symbols that allow a receiver to acquire and establish a link with the transmitter. Detection of a packet is often an important operation in establishing or maintaining a communication link. Symbol timing, channel length estimation-related and channel response estimation-related processes can also be significant elements of the larger communication process. Given the shortcomings of prior art solutions for packet detection, symbol timing, channel length estimation, and channel response estimation, it is desirable to provide solutions that allow valuable benefits to be gained.

SUMMARY

A method is described. The method includes producing a first signal match indication based on at least one match indication indicative of a match between at least one signal received in at least one band and a reference signal. The method also includes producing a first signal multipath combined signal based upon the first signal match indication, and detecting a first peak in the first multipath combined signal.

BRIEF DESCRIPTION OF THE DRAWINGS

The invention is illustrated by way of example, and not limitation, in the figures of the accompanying drawings in which like references denote similar elements, and in which:

FIG. 2a illustrates a packet including synchronization symbols transmitted across three bands using frequency hopping with a time frequency code period of three symbol periods;

FIG. 2b illustrates a symbol, according to an embodiment;

FIG. 2c illustrates a fraction of a packet including synchronization symbols transmitted across three bands using frequency hopping with a time frequency code period of six symbol periods;

FIG. 2d illustrates an overlap-and-add operation at a receiver according to an embodiment;

FIG. 9a illustrates placement of an FFT based on timestamp value according to an embodiment;

FIG. 9b illustrates determination of a timestamp value according to an alternative embodiment;

FIG. 12a illustrates part of a receiver chain including a channel estimator according to an embodiment of the invention;

FIG. 12b illustrates a memory including multiple channel estimate filters according to an embodiment;

FIG. 12c illustrates a process for generating a filtered channel estimate according to an embodiment;

DETAILED DESCRIPTION

Figure 1A:
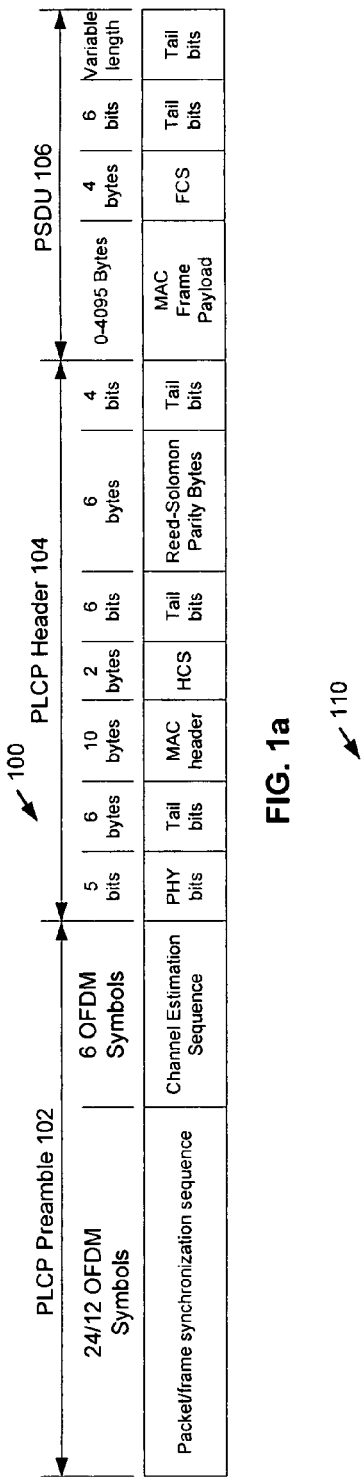
FIG. 1a illustrates a packet and its component elements according to an embodiment of the invention.

Methods and apparatus including but not limited to those for packet detection, timing acquisition and adjustment, channel length estimation and channel response estimation are described. In the following description, for purposes of explanation, numerous specific details are set forth in order to provide a thorough understanding of embodiments according to the invention. It will be evident, however, to one of ordinary skill in the art that the invention may be practiced in a variety of contexts including but not limited to ultra-wideband frequency hopping systems without these specific details. In other instances, well-known operations, steps, functions and elements are not shown in order to avoid obscuring the description.

Parts of the description will be presented using terminology commonly employed by those skilled in the art to convey the substance of their work to others skilled in the art, such as matched filter (MF), packet synchronization sequence, signal-to-noise ratio (SNR), signal strength, multipath combining, moving-average accumulator and so forth. Various operations will be described as multiple discrete steps performed in turn in a manner that is most helpful in understanding the embodiments according to the invention. However, the order of description should not be construed as to imply that these operations are necessarily performed in the order that they are presented, or even order dependent. Repeated usage of the phrases "in an embodiment," "an alternative embodiment," or an "alternate embodiment" does not necessarily refer to the same embodiment, although it may. Additionally, one of ordinary skill in the art would appreciate that a graphical description of an apparatus in the figures of the drawings interchangeably represents either an apparatus or a method.

Wireless network devices can 'discover' each other in order to establish a network or a communication link. Examples of network devices discovering each other include the case of a wireless network communications card in a portable computer detecting the presence of a wireless router that can provide access to the Internet, printers, other computers, or storage devices. Another example is the case of a computer communicating with a printer through a wireless channel instead of a cable or an intervening router. When the printer is first turned on it can tune to a certain band or bands to determine what devices are in its vicinity and with which it can communicate. Instead of connecting the printer and the computer using a cable, the printer and computer 'synch' up and establish a communication link on behalf of a user and can be used rather soon after being turned on. To 'synch' up, the printer's receiver detects and demodulates a packet transmitted by the computer's transmitter and that includes a synchronization sequence. The packet may also include data which may provide information and instructions needed in order to establish a data link between the devices.

It is highly desirable for devices to 'synch' up rapidly after the receiver of a first device, such as the printer in the above example, is turned on in the vicinity of a transmitter of a second device, such as the computer in the above example. Furthermore, due to the variability of the wireless channel, synchronization may be necessary at the beginning of every subsequent packet as well. The foregoing example involving a network, printer and computer is provided for purposes of illustration and to facilitate understanding of one possible context in which one or more embodiments of the invention may be used. Such illustration is not intended to suggest that the embodiments are limited to use in networks, printers, computers, media players, cell phones or electronic devices of any particular type, but in some cases they may be so used.

The 'synch' process is at least partly dependent on the modulation and frequency or bandwidth management characteristics that govern the operation of the devices. Orthogonal Frequency Division Multiplexing (OFDM) or Orthogonal Frequency Division Multiple Access (OFDMA) employing orthogonal frequency domain modulation is a popular modulation technique for wireless communications. OFDM has been adopted in standards for technologies such as wireless networks (802.11a/g), digital television broadcasting (DVB-T/S/H and ISDB-T), broadband wireless local loops (802.16e/WiMax), but also relatively short-range wireless USB (universal serial bus) or personal area network (PAN) communication. Most applications of OFDM have not employed frequency hopping and/or wideband operation. However, wireless PAN communication, which is expected to provide throughputs of up to 480 Mb/s for relatively short distances, can employ frequency hopping across three 528 MHz-wide bands, and is commonly referred to as UWB-OFDM (ultra-wideband OFDM) or multi-band OFDM (MB-OFDM).

The combination of phenomena such as wideband operation, frequency hopping, low power operation and multipath interference influences reliable packet detection which is needed in order for a communication link to be established relatively rapidly after the receiver is in the vicinity of a transmitter with which it wants to communicate and for the communication link to be maintained once established. It is not desirable to take too long to detect a packet or to have the user be required to unreasonably manipulate the receiver so that it has an orientation and location that could make packet detection easier. The invention is not limited to embodiments that are able to handle all of the foregoing phenomena. Some embodiments may handle well the foregoing phenomena individually. Other embodiments may handle well two or more of the foregoing phenomena in combination.

As will become apparent from the description, reliable packet detection involves, depending upon the embodiment, one or more of the following: the detection of packet synchronization symbols, signal strength determination, and the accurate determination of a time frequency code (TFC) or frequency hopping pattern. In an alternative embodiment, a received packet's symbol samples are also processed in order to do one or more of the following: determine an estimate of the channel response; determine a fine timing index, and determine a fine channel length estimate.

FIG. 1$a$ illustrates a packet and its component elements according to an embodiment of the invention. Alternative embodiments may have packets with an alternative structure. Packet 100 includes three components: PLCP (physical layer convergence protocol) preamble 102, PLCP header 104 and PSDU (PLCP Service Data Unit) 106. The components are listed in the order of transmission. PLCP preamble 102 is the first component of packet 100 and can be further decomposed into a packet/frame synchronization sequence, and a channel estimation sequence. PLCP preamble 102 aids the receiver in, among other things, timing synchronization, carrier-offset recovery and channel estimation.

PLCP header 104 is the second component of packet 100. The goal of this component is to convey necessary information about both the PHY, physical layer, and the MAC, media access layer, to aid in decoding of the data in PSDU 106 at the receiver. PLCP header 104 can be further decomposed into a PHY header, MAC header, header check sequence (HCS), tail bits and Reed-Solomon parity bits. Tail bits are added between the PHY header and MAC header, HCS and Reed-Solomon parity bits, and at the end of PLCP header 104 in order to return a convolutional encoder (not shown) to the "zero state." The Reed-Solomon parity bits are added in order to improve the robustness of PLCP header 104.

PSDU 106 is the last component of packet 100. This component is formed by concatenating the frame payload with the frame check sequence (FCS), tail bits and finally pad bits, which are inserted in order to align the data stream on the boundary of a symbol interleaver (not shown).

When transmitting packet 100, PLCP preamble 102 is sent first, followed by PLCP header 104 and finally by PSDU 106. PLCP header 104 is a codeword of a systematic Reed-Solomon code, appended with tail bits. In an embodiment, the systematic part of PLCP header 104 is always sent at a data rate of 39.4 Mb/s. However, alternative embodiments may have data rates less than or greater than 39.4 Mb/s.

PSDU 106 is sent at the desired data rate. In an embodiment, rates for sending PSDU 106 include, but are not limited to: 53.3, 80, 106.7, 160, 200, 320, 400 or 480 Mb/s; alternative embodiments may have different rates that can be higher or lower or the same as the foregoing rates.

As indicated, preamble 102 includes a synchronization sequence of symbols. The synchronization sequence symbols are predefined and known to the receiver and transmitter allowing detection by the receiver using, for example, a matched filter. The synchronization sequence symbols need not be transmitted all in one band or at one carrier frequency.

FIG. 2a illustrates a packet including synchronization symbols transmitted across three bands using frequency hopping with a time frequency code period of three symbol periods. Packet 120 includes synchronization symbols 121a-c, 122a-c (collectively, 121 and 122). Symbols 121a, 121b, 121c are transmitted sequentially over band 1, band 2, and band 3, respectively. The same hopping pattern is used to transmit synchronization symbols 122a-c as well as frame synchronization symbols 123a-c, channel estimation symbols 124a-c, 125a-c, header symbols (not shown) and data, or more accurately PSDU, symbols 126a-c. Hopping across band 1, band 2 and band 3 is referred to as a time-frequency code (TFC). Each unique pattern of hopping across bands is referred to by the label "TFC" and a code number, such as TFC 1, TFC 2, etc. . . . In an embodiment, each unique hopping pattern has a unique mapping to a TFC such that there is a unique one-to-one mapping between a particular TFC and a particular hopping pattern.

While particular embodiments are described as having modes of operation including a certain band hopping pattern or patterns, an alternative embodiment may have modes of operation that include both at least one mode with band hopping and at least one mode without band hopping. An alternative embodiment has only a single band mode of operation. The invention is not limited to frequency hopping over 3 bands but encompasses, depending upon the embodiment, one or more of the following: hopping across 2 bands, 3 or more bands, and no hopping across bands. The invention in an embodiment can selectively switch among 3 (or more) band hopping operation, 2 band hopping operation and single band operation.

Furthermore, the bands across which hopping occurs may be a subset of a much larger group of bands. In an embodiment, a receiver can operate across up to 14 bands, each with a bandwidth of 528 MHz. The first 12 bands are grouped into 4 band groups consisting of 3 bands in each group. The last two bands are grouped into a fifth band group. A sixth band group may also be defined within the spectrum of the first four bands. In an embodiment, the receiver's 14 bands are in the frequency range between 3.1 GHz to 10.6 GHz, but as one of ordinary skill in the art would appreciate the invention is not limited to any particular frequency range.

The invention is not limited to a certain number of sub-carriers or orthogonal frequency division modulation (OFDM) of the sub-carriers. However, in an embodiment, a receiver receives OFDM signals on 110 sub-carriers (100 data carriers and 10 guard carriers) per band on which it operates. In addition, the receiver is able to utilize 12 pilot subcarriers for coherent detection. The invention is not limited to any specific techniques for immunizing a signal against fading or noise such as frequency-domain spreading, time-domain spreading, and forward error correction (FEC) coding. However, depending upon the embodiment, one or more of the following techniques may be used: frequency-domain spreading, time-domain spreading, and forward error correction (FEC) coding.

In an embodiment, coded data is spread using a TFC. The invention is not limited to any particular type or types of TFC codes. However, depending upon the embodiment, a receiver is able to detect and demodulate signals sent according to one or more of the following three types of TFCs: a TFC in which the coded information is interleaved over three (or more) bands, referred to as Time-Frequency Interleaving (TFI); a TFC in which the coded information is interleaved over two bands, referred to as two-band TFI or TFI2; and a TFC in which the coded information is transmitted on a single band, referred to as Fixed Frequency Interleaving (FFI). However, as indicated, the invention is not limited to the three types (TFI, TFI2, and FFI), and receivers according to some embodiments may receive information interleaved over three or more bands.

The invention is not limited to any particular arrangement for assigning TFI, TFI2 or FFI to groups of bands, where each assignment is considered to be channel. For example, in an embodiment, within the first four and the sixth band groups, four time-frequency codes using TFI and three time-frequency codes using each of TFI2 and FFI are defined; thereby, providing support for up to ten channels in each band group. For the fifth band group, two time-frequency codes using FFI and one using TFI2 are defined. For the sixth band group, the FFI channels and one of the TFI2 channels overlap fully with channels in the third and fourth band groups. While an embodiment allows operation according to 10 TFCs—4 TFI, 3 TFI2, and 3 FFI—, the invention is not limited to any particular number of TFCs or types (e.g., including but not limited to TFI, TFI2 or FFI) of TFCs.

The invention is not limited to any particular techniques for allowing the PHY layer to be used in a range of regulatory and radio coexistence scenarios. For example, in an embodiment, a mechanism is provided to allow a receiver to demodulate and decode a signal even though individual OFDM subcarriers are nulled. Nulling in addition to a choice with regards to usage of frequency ranges, bands, and of TFI, TFI2 and FFI time frequency codes, provides substantial control over the use of spectrum by the transmitted signal. Additional details regarding spectrum management, band use, and synchronization sequences may be found in references including but not limited to "WiMedia Alliance, Multiband OFDM Physical Layer Specification, Draft Specification Release 1.2 Feb. 2007, hereafter referred to herein as "WiMedia Specification"."

FIG. 2b illustrates a symbol, according to an embodiment. Symbol 130a is representative of symbols 121a-c, 122a-c, 123a-c, 124a-c, 125a-c, 126a-c of FIG. 2a. A symbol, such as symbol 130a includes an OFDM symbol 130b and a zero-padded suffix 130c which serves two purposes: it provides a mechanism to mitigate the effects of multipath; and, it provides a time window (a guard interval) to allow sufficient time for the transmitter and receiver to switch from one band to another band.

While a packet is composed of OFDM symbols in an embodiment, one of ordinary skill in the art would appreciate that the invention is not limited to OFDM symbols and that the teachings of the disclosure can be applied to other types of modulation without undue experimentation.

In an embodiment, the OFDM symbol is represented by $N_{FFT}=128$ samples at the receiver and the zero-padded suffix (ZPS) is represented by $N_{ZPS}=37$ samples for a total of $N_{SYM}=165$ samples for one symbol. The invention is not limited to the foregoing values for OFDM symbol length in terms of number of samples, $N_{FFT}$, and ZPS length in terms of number of samples, $N_{ZPS}$.

FIG. 2c illustrates a fraction of a packet including synchronization symbols transmitted across three bands using frequency hopping with a time frequency code period of six symbol periods. Packet 126 represents the case where a transmitter (not shown) transmits in a band for the duration of two symbol periods before switching (or hopping) to another band. When the transmitter transmits for two symbol periods in each of three bands before repeating the TFC cycle, the TFC period is 6 symbol periods. Consequently, a receiver receives symbols 127a, 127b in band 1, symbols 127c, 127d in band 2, and symbols 127e, 127f in band 3 before the TFC cycle repeats itself in band 1 starting with symbol 128a. The TFC for packet 126 can be represented as {1, 1, 2, 2, 3, 3}. As described elsewhere herein, in an embodiment, depending upon when a receiver starts receiving and processing symbols, the TFC for packet 126 can appear—incorrectly—as though it were {1, 2, 2, 3, 3, 1}.

Table 1 below illustrates TFC codes and their corresponding synchronization base sequences, $S_{n,base}[i]$, and hopping patterns according to an embodiment, where n is the base sequence number, and $1 \leq i \leq N_{FFT}$.

TABLE 1

| TFC Number | $S_{n,base}[i]$, n = | Band Hopping Pattern for TFC | | | | | |
|---|---|---|---|---|---|---|---|
| 1 | 1 | 1 | 2 | 3 | 1 | 2 | 3 |
| 2 | 2 | 1 | 3 | 2 | 1 | 3 | 2 |
| 3 | 3 | 1 | 1 | 2 | 2 | 3 | 3 |
| 4 | 4 | 1 | 1 | 3 | 3 | 2 | 2 |
| 5 | 5 | 1 | 1 | 1 | 1 | 1 | 1 |
| 6 | 6 | 2 | 2 | 2 | 2 | 2 | 2 |
| 7 | 7 | 3 | 3 | 3 | 3 | 3 | 3 |
| 8 | 8 | 1 | 2 | 1 | 2 | 1 | 2 |
| 9 | 9 | 1 | 3 | 1 | 3 | 1 | 3 |
| 10 | 10 | 2 | 3 | 2 | 3 | 2 | 3 |

Each of the synchronization base sequences, $S_{n,base}[i]$, is unique such that a receiver that matches received synchronization symbol samples with the samples of a stored synchronization sequence can identify the associated TFC, and, consequently, the associated band hopping pattern. In an embodiment, each synchronization base sequence, $S_{n,base}[i]$, comprises a sequence of $N_{FFT}=128$ real-valued samples that are unique to the sequence. Additional information about synchronization sequences can be found in the WiMedia Specification.

In an alternative embodiment, each $N_{FFT}$ sample synchronization sequence is made from two sequences, a 16 sample base sequence and an 8 sample spreading sequence. The values in the 16 sample base sequence and 8 sample spreading sequence are either 1 or −1 each of which can be represented by 1 bit allowing for compact storage in a receiver and 'on-the-fly' or 'as needed' generation of each $N_{FFT}$ sample sequence. While $N_{FFT}$ is 128 in an embodiment, one of ordinary skill in the art would appreciate that the invention is not limited to $N_{FFT}$ being 128 and that other values, larger or smaller can be used in accordance with the teachings of the invention without undue experimentation.

Table 2 below illustrates ten 16 sample base sequences according to an embodiment.

TABLE 2

| Base Sequence | Length-16 Samples | | | | | | | | | | | | | | | |
|---|---|---|---|---|---|---|---|---|---|---|---|---|---|---|---|---|
| 1 | 1 | 1 | 1 | 1 | −1 | −1 | 1 | 1 | −1 | −1 | 1 | −1 | 1 | −1 | 1 | 1 |
| 2 | 1 | −1 | −1 | −1 | −1 | −1 | 1 | −1 | 1 | −1 | −1 | 1 | 1 | −1 | −1 | 1 |
| 3 | 1 | 1 | −1 | −1 | −1 | 1 | −1 | −1 | −1 | 1 | −1 | −1 | 1 | −1 | 1 | 1 |
| 4 | 1 | −1 | 1 | −1 | 1 | −1 | −1 | 1 | 1 | −1 | −1 | −1 | −1 | −1 | −1 | 1 |
| 5 | 1 | 1 | 1 | −1 | 1 | 1 | 1 | −1 | 1 | −1 | 1 | 1 | −1 | 1 | −1 | −1 |
| 6 | 1 | 1 | −1 | 1 | −1 | 1 | −1 | 1 | 1 | −1 | 1 | 1 | 1 | 1 | −1 | −1 |
| 7 | 1 | 1 | −1 | −1 | −1 | −1 | 1 | −1 | −1 | 1 | −1 | 1 | −1 | 1 | −1 | −1 |
| 8 | 1 | 1 | 1 | 1 | −1 | 1 | −1 | 1 | 1 | 1 | −1 | 1 | 1 | −1 | −1 | 1 |
| 9 | −1 | 1 | −1 | 1 | 1 | −1 | 1 | 1 | 1 | −1 | 1 | 1 | 1 | −1 | −1 | 1 |
| 10 | 1 | −1 | −1 | 1 | −1 | −1 | 1 | −1 | −1 | −1 | 1 | 1 | 1 | −1 | −1 | −1 |

Table 3 illustrates ten 8 sample spreading sequences according to an embodiment.

TABLE 3

| Spreading Sequence | Length-8 samples | | | | | | | |
|---|---|---|---|---|---|---|---|---|
| 1 | 1 | −1 | −1 | −1 | 1 | 1 | −1 | 1 |
| 2 | 1 | −1 | 1 | 1 | −1 | −1 | −1 | 1 |
| 3 | 1 | 1 | −1 | 1 | 1 | −1 | −1 | −1 |
| 4 | 1 | 1 | 1 | −1 | −1 | 1 | −1 | −1 |
| 5 | 1 | 1 | 1 | −1 | −1 | −1 | 1 | −1 |
| 6 | 1 | −1 | 1 | 1 | 1 | −1 | −1 | −1 |
| 7 | 1 | 1 | 1 | −1 | −1 | −1 | 1 | −1 |
| 8 | −1 | −1 | 1 | −1 | 1 | −1 | 1 | 1 |
| 9 | 1 | 1 | −1 | 1 | −1 | −1 | −1 | 1 |
| 10 | −1 | 1 | 1 | 1 | −1 | 1 | −1 | −1 |

For each TFC, a base sequence with 16 samples is spread by a spreading sample sequence with 8 samples to obtain a unique 128 sample synchronization base sequence $\{b_k\}$, where $1 \leq k \leq 128$. The synchronization sequence for TFC 1, $\{b_{1,k}\}$ is produced from base sequence 1 and spreading sequence 1, and the synchronization sequence for TFC 2, $\{b_{2,k}\}$ is produced from base sequence 2 and spreading sequence 2, and so forth up to TFC 10.

In an embodiment, one synchronization sequence is used to transmit a packet. However, in an alternative embodiment, one or more of synchronization base sequences $\{b_{1-10,k}\}$ may be used at the transmitter to transmit synchronization symbols and at the receiver to detect received synchronization symbols.

In an embodiment, the synchronization sequence of each TFC is spread with a symbol cover sequence so that the same synchronization sequence is not used with each of the packet synchronization and frame synchronization symbols of the TFC.

In an embodiment, for a preamble with $m_{SYM}=24$ symbols, where $m_{SYM}$ is the number of symbols in a preamble synchronization sequence, Table 4 illustrates the cover sequences for various TFCs. A table similar to Table 4 can be made for preambles that have fewer than 24 symbols. In an embodiment, a burst preamble has a 12 symbol synchronization sequence. In Table 4, the 'r' in $Seq_{r,cover}[m]$ along with the information in the top row of Table 4 indicates which TFCs are associated with a cover synchronization sequence, $Seq_{r,cover}[m]$.

TABLE 4

| Symbol m of preamble synch sequence | $Seq_{r,cover}[m]$ for TFCs 1, 2 r = 1 | $Seq_{r,cover}[m]$ for TFCs 3, 4 r = 2 | $Seq_{r,cover}[m]$ for TFCs 5, 6, 7 r = 3 | $Seq_{r,cover}[m]$ for TFCs 8, 9, 10 r = 4 |
|---|---|---|---|---|
| 0  | 1  | 1  | −1 | 1  |
| 1  | 1  | 1  | −1 | 1  |
| 2  | 1  | 1  | −1 | −1 |
| 3  | 1  | 1  | −1 | −1 |
| 4  | 1  | 1  | −1 | 1  |
| 5  | 1  | 1  | −1 | 1  |
| 6  | 1  | 1  | −1 | 1  |
| 7  | 1  | 1  | 1  | −1 |
| 8  | 1  | 1  | −1 | 1  |
| 9  | 1  | 1  | −1 | 1  |
| 10 | 1  | 1  | 1  | −1 |
| 11 | 1  | 1  | −1 | −1 |
| 12 | 1  | 1  | −1 | 1  |
| 13 | 1  | 1  | 1  | 1  |
| 14 | 1  | 1  | −1 | −1 |
| 15 | 1  | 1  | −1 | −1 |
| 16 | 1  | 1  | 1  | 1  |
| 17 | 1  | 1  | −1 | 1  |
| 18 | 1  | 1  | −1 | 1  |
| 19 | 1  | −1 | 1  | 1  |
| 20 | 1  | 1  | −1 | 1  |
| 21 | −1 | −1 | 1  | 1  |
| 22 | −1 | 1  | 1  | −1 |
| 23 | −1 | −1 | 1  | −1 |

Figure 1B:
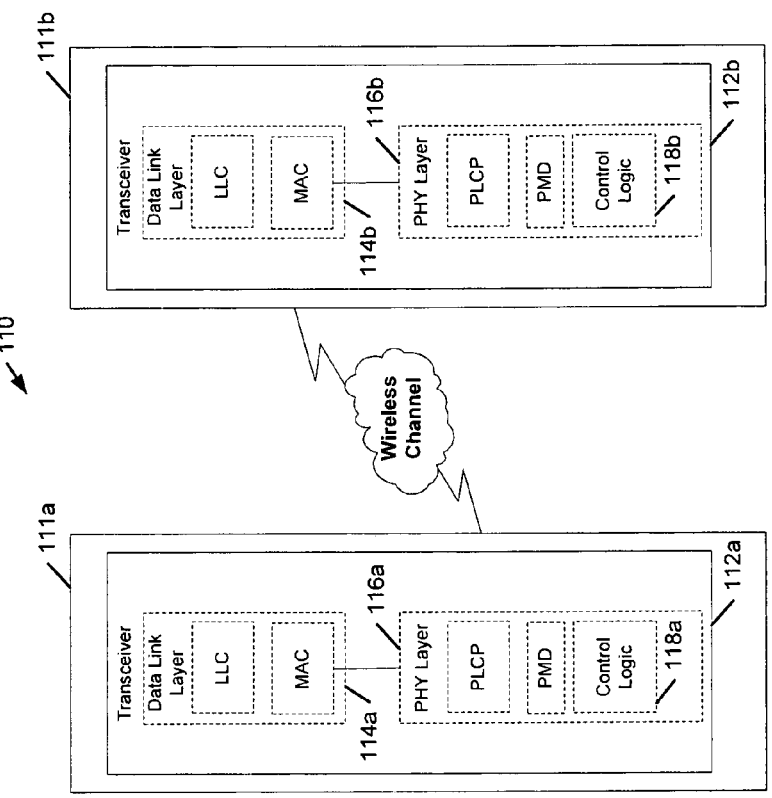
FIG. 1b illustrates a system in accordance with an embodiment of the disclosure.

FIG. 1b illustrates a system 110 in accordance with an embodiment of the disclosure. As shown in FIG. 1b, the system 110 comprises devices 111a and 111b. Device 111a includes a transceiver 112a having a data link layer 114a and a PHY layer 116a. Similarly, device 111b includes a transceiver 112b having a data link layer 114b and a PHY layer 116b. In at least some embodiments, the data link layers and the PHY layers function according to a standardized communication protocol. For clarity, only the components of device 111a are described in greater detail. However, the same discussion would apply to the components of device 111b. Devices 111a, 111b, are multimedia devices or other electronic devices including one or more embodiments of the invention.

In order for device 111a to communicate wirelessly, the PHY layer 116a and the data link layer 114a perform several functions such as preparing, transmitting, receiving, and decoding wireless signals. In some embodiments, PHY layer 116a implements a physical layer convergence procedure (PLCP) sub-layer, a physical medium dependent (PMD) sub-layer and control logic 118a. Depending upon the embodiment, PHY layer 116a may include an overlap-and-add length logic unit for processing OFDM symbols with zero-padded suffixes.

The PLCP sub-layer of device 111a enables carrier sense and clear channel assessment (CCA) signals to be provided to the data link layer 114a (indicating when the PHY layer 116a is in use). The PMD sub-layer of the PHY layer 116a provides encoding, decoding, modulation, and/or demodulation of information symbols for device 111a. In some embodiments, the PMD sub-layer of the PHY layer 116a permits device 111a to implement modulation techniques such as multi-band OFDM, in an embodiment. The PMD sub-layer also may provide functions such as analog-to-digital and/or digital-to-analog data conversion.

As shown, the data link layer 114a implements a logical link control (LLC) and a medium access control (MAC). During transmission of data, the LLC assembles data frames with address and cyclic redundancy check (CRC) fields. During reception of data, the LLC disassembles data frames, performs address recognition, and performs CRC validation. The MAC functions, at least in part, to coordinate transmission of data between the electronic device 111a and other devices (e.g., device 111b). Control logic 118a of FIG. 1b coordinates the operations of units in the receive chain that participate in the detection of packets. The operation of control logic 118a will become clearer from the description of the control logic of receivers according to various embodiments described herein.

Figure 3:
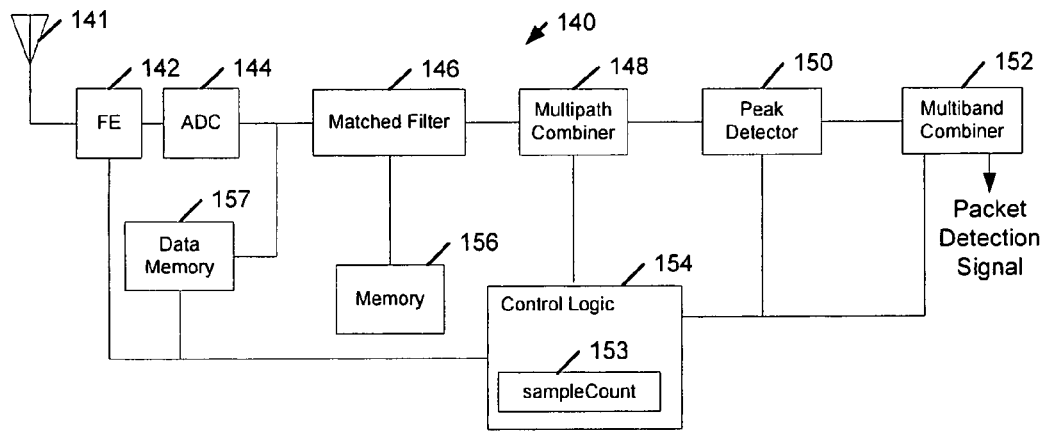
FIG. 3 illustrates a block diagram of a receiver according to an embodiment of the invention.

FIG. 3 illustrates a block diagram of a receiver according to an embodiment of the invention. In an embodiment, receiver 140 performs packet detection. Receiver 140 represents an embodiment of the invention that detects packets and includes one or more units which can be substituted with other one or more other units as described elsewhere herein or modified as described elsewhere herein to create alternative embodiments which also perform, depending upon the embodiment, one or more of the following, but are not limited to performing: packet detection, symbol timing determination, timing adjustment, channel length estimation and channel response estimation.

Figure 8:
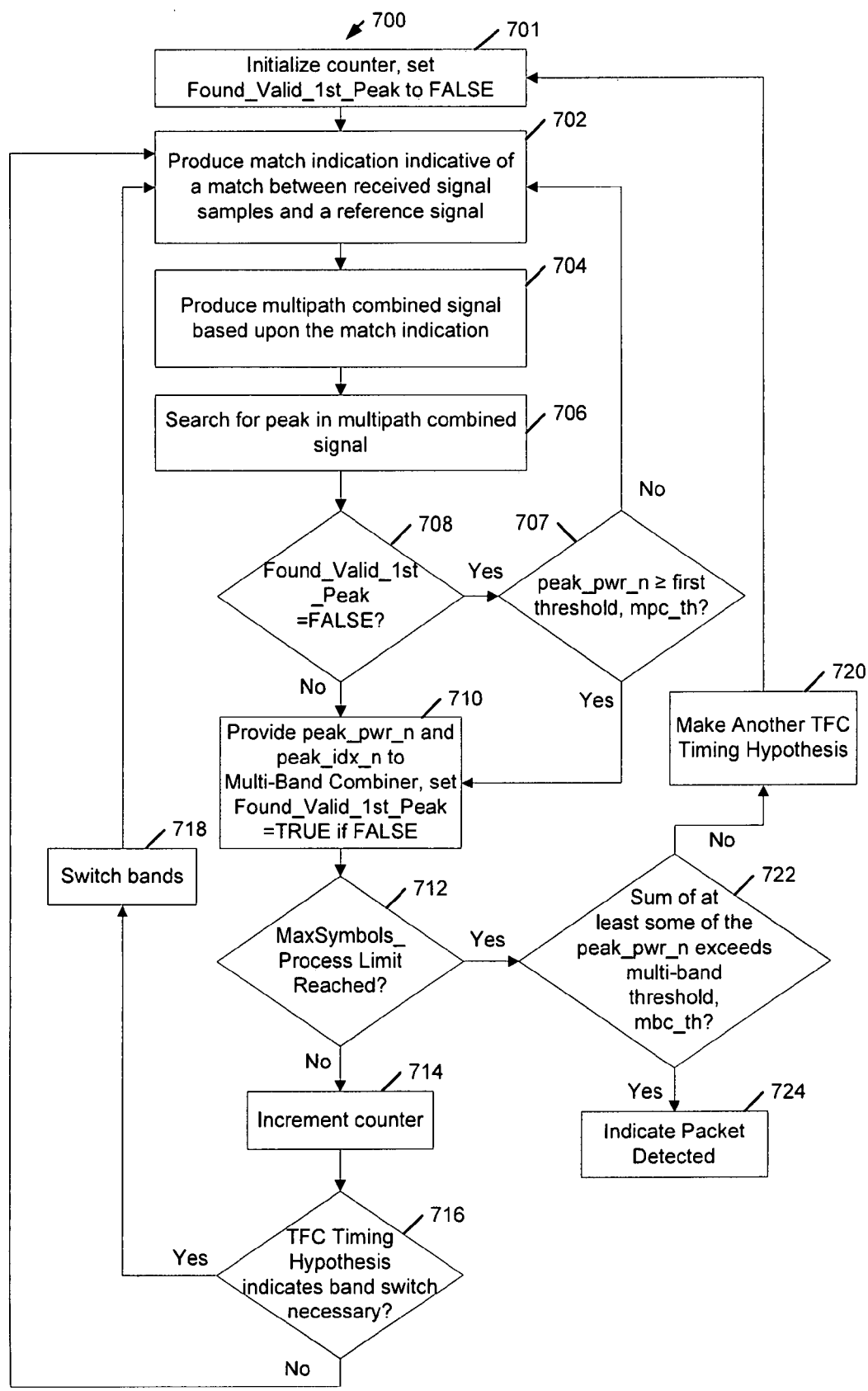
FIG. 8 illustrates a process for performing packet detection according to an embodiment of the invention.

FIG. 8 illustrates a process for performing packet detection according to an embodiment of the invention. Process 700 represents a method of detecting packets according to an embodiment of the invention and includes one or more operations which can be implemented in alternative ways so as to create alternative embodiments which also perform packet detection. Process 700 is described below in connection with the description of receiver 140 of FIG. 3 and the description of alternative units for receiver 140 illustrated in other figures identified below. While process 700 represents a technique for doing packet detection where there is a possibility of ambiguity with regards to timing with a TFC cycle, as indicated elsewhere herein the invention is not limited to working with a fixed TFC and discovering the proper timing but encompasses trying various reference signals (or synchronization sequences) in order to identify the particular synchronization sequence and thereby the TFC being used by a transmitter. After the synchronization sequence being used by a transmitter to transmit synchronization symbols is identified from the set of possible TFCs, timing ambiguity if any can be remedied as indicated in the description of process 700 herein.

Receiver 140 includes antenna (ANT) 141 which receives radio frequency (RF) signals from a transmitter (not shown) such as the one of device 111a and provides them to front end (FE) 142 for amplification, down-conversion (if necessary) and gain control. Front end 142 provides to analog-to-digital converter (ADC) 144 a baseband, low-pass filtered signal based on the received RF signal. ADC 144 samples the low-pass filtered signal and provides the samples to matched filter 146. Matched filter (MF) 146 receives from memory (MEM) 156 the values of a synchronization base sequence to be used for 'comparison' with the received samples. In an embodiment, control logic (CL) 154 loads MF 146 with the stored values for a base synchronization sequence. A synchronization sequence used by MF 146 may also be referred to as a reference signal herein.

The base synchronization sequence retrieved from MEM 156 is representative of the base synchronization sequence—without the phase shift introduced by a cover sequence—actually transmitted by a transmitter to receiver 140. One of ordinary skill in the art would appreciate that due to channel effects and noise the received synchronization sequence signal will not have the 'clean representation' of the base synchronization sequence stored in MEM 156 or the signal actually transmitted by a transmitter. Consequently, the output of a matched filter, such as filter 146, is likely to be 'noisy.'

Figure 6A:
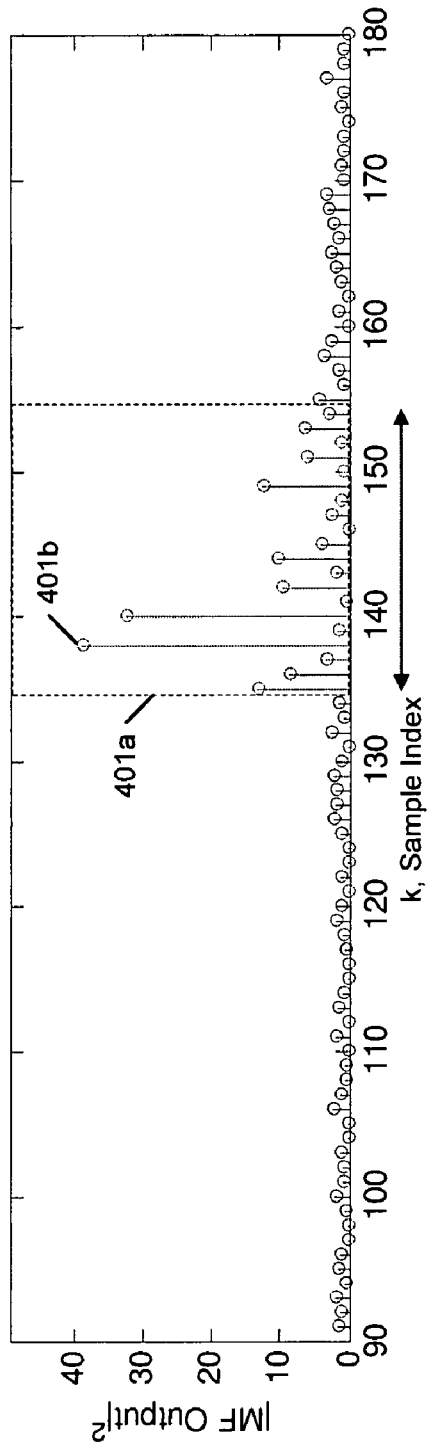
FIG. 6a illustrates the magnitude squared output of a matched filter according to an embodiment.

FIG. 6a illustrates the magnitude squared output of a matched filter according to an embodiment. The output of a matched filter has a fairly prominent peak 401b, as shown in FIG. 6a, when the received samples are similar to the stored synchronization sequence.

Figure 4A:
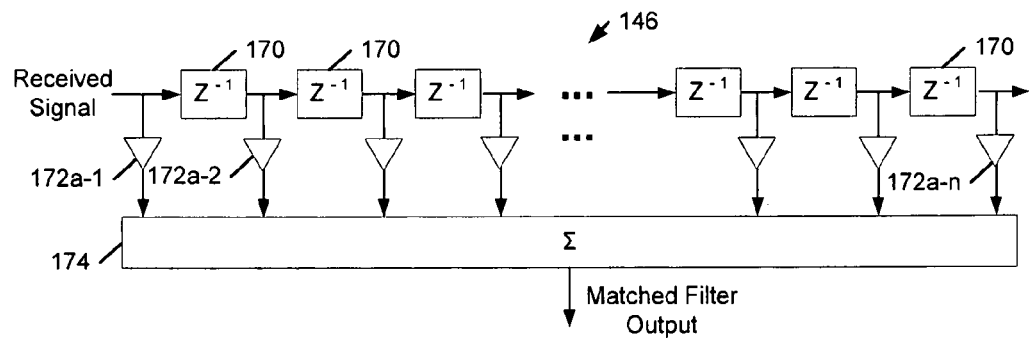
FIG. 4a illustrates a matched filter according to an embodiment of the invention.

FIG. 4a illustrates a matched filter according to an embodiment of the invention. Filter 146 of FIG. 4a is representative of filter 146 of FIG. 3. In an embodiment, filter 146 of FIG. 4a includes 127 delay elements 170, 128 multipliers 172a-1 through 172a-n and a summer 174. Multipliers 172a-1 through 172a-n are loaded with synchronization base sequence values retrieved from MEM 156. Received signal samples from ADC 144 are passed through delay elements 170 where they are stored, and every clock cycle they are shifted and multiplied with the synchronization base sequence values in multipliers 172a-1 to 172a-n to produce 128 values at each clock cycle that are summed by summer 174. Of the 128 values, 127 values are due to the 127 stored received signal sample values and an additional, or $128^{th}$, value is due to the most recent sample. Matched filter 146 of FIG. 4a is a single-stage matched filter.

In an embodiment, rather than 'raw' received signal samples from ADC 144 passing through filter 146, the sign of each of the received signal samples each of which is represented by a single bit is passed through filter 146. In yet another alternative embodiment, instead of performing integer or floating point multiplication on account of multipliers 172a-1 to 172a-n being loaded with integer or real values, the sign of the synchronization base sequence values are stored in multipliers 172a-1 to 172a-n.

Figure 4B:
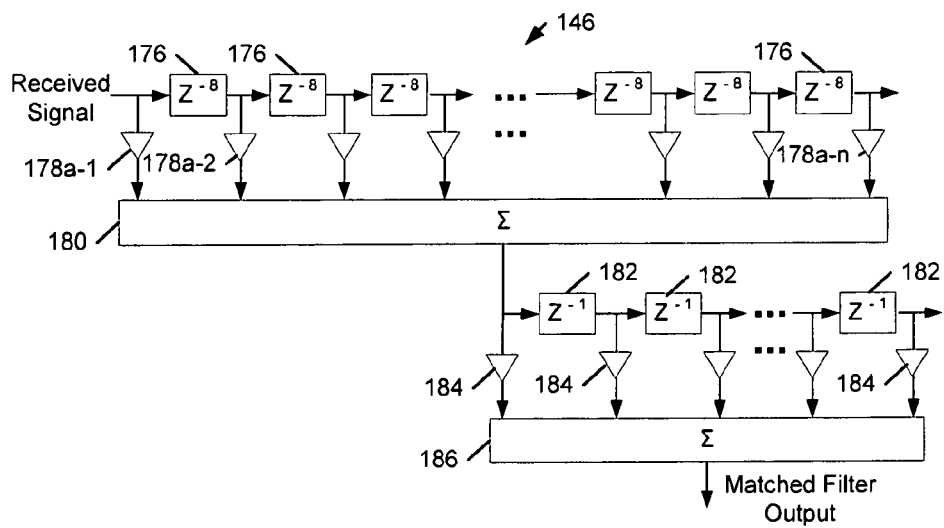
FIG. 4b illustrates a matched filter according to an alternative embodiment of the invention.

FIG. 4b illustrates a matched filter according to an alternative embodiment of the invention. Filter 146 of FIG. 4b is representative of filter 146 of FIG. 3. Matched filter 146 of FIG. 4b is a two-stage matched filter. In an embodiment, filter 146 of FIG. 4b includes 15 delay elements 176, 16 multipliers 178a-1 through 178a-n and a summer 180. Multipliers 178a-1 through 178a-n are loaded with length-16 base sequence values—such as those described above in connection with Table 2—retrieved from MEM 156. Received signal samples from ADC 144 are passed through delay elements 176 and multiplied with the 16 sample base sequence values in multipliers 178a-1 to 178a-n to produce 16 values at each clock cycle that are summed by summer 180.

The output of summer 180 is passed through 7 delay elements 182 and multiplied by multipliers 184. Multipliers 184 are loaded with length-8 sequence values—such as those described in connection with Table 3—retrieved from MEM 156.

The output of summer 180 is passed through delay elements 182 and multiplied with the 8 sample spreading sequence values in multipliers 184 to produce 8 values at each clock cycle that are summed by summer 186. The output of summer 186 is applied to multipath combiner 148.

In an embodiment, rather than 'raw' received signal samples from ADC 144 passing through filter 146, the sign of each of the received signal samples each of which is represented by a single bit is passed through filter 146 of FIG. 4b.

Figure 6B:
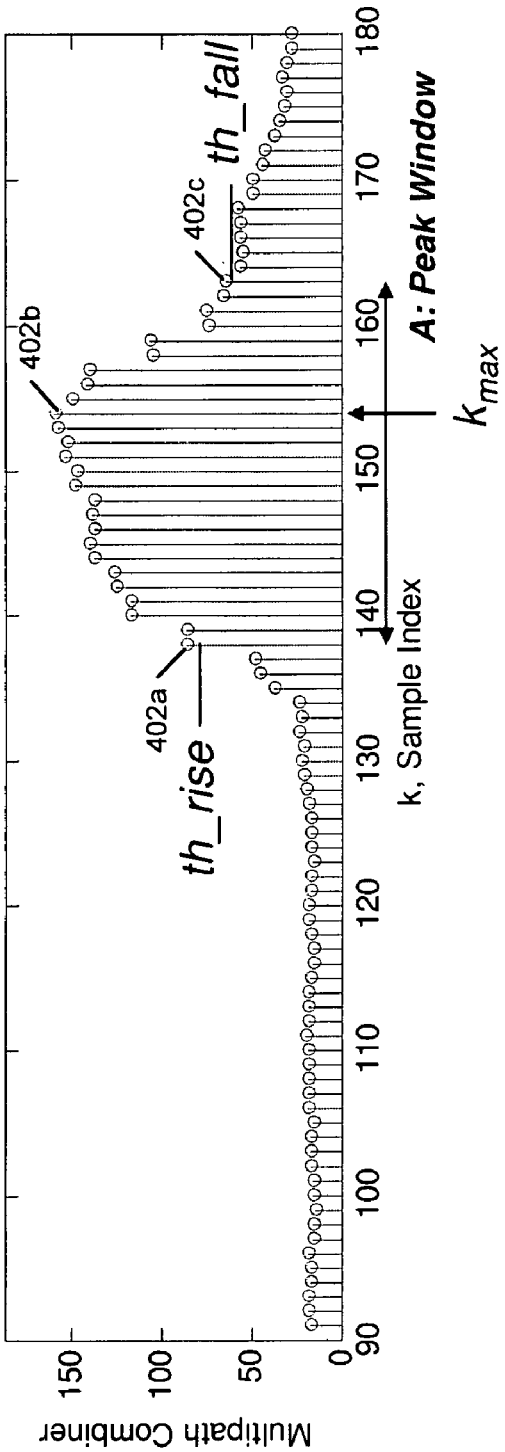
FIG. 6b illustrates the output of a multipath combiner according to an embodiment.

FIG. 6b illustrates the output of a multipath combiner according to an embodiment. FIG. 6b includes reference indicators indicative of parameters used to identify a valid peak indicative of the receipt of a synchronization symbol that matches the synchronization sequence whose coefficients are stored in MF 146. The output of MPC 148 is applied to peak detector (PD) 150. MPC 148 is a sliding combining window with width or length M. For the case illustrated by FIG. 6a, MPC 148 slides window 401a across the squared amplitude of the output of MF 146. In an embodiment, MPC 148 acts as a moving-average accumulator for the squared amplitude of the output of MF 146. In an alternative embodiment, MPC 148 acts as a moving-average accumulator for the amplitude of the output of MF 146.

Figure 5A:
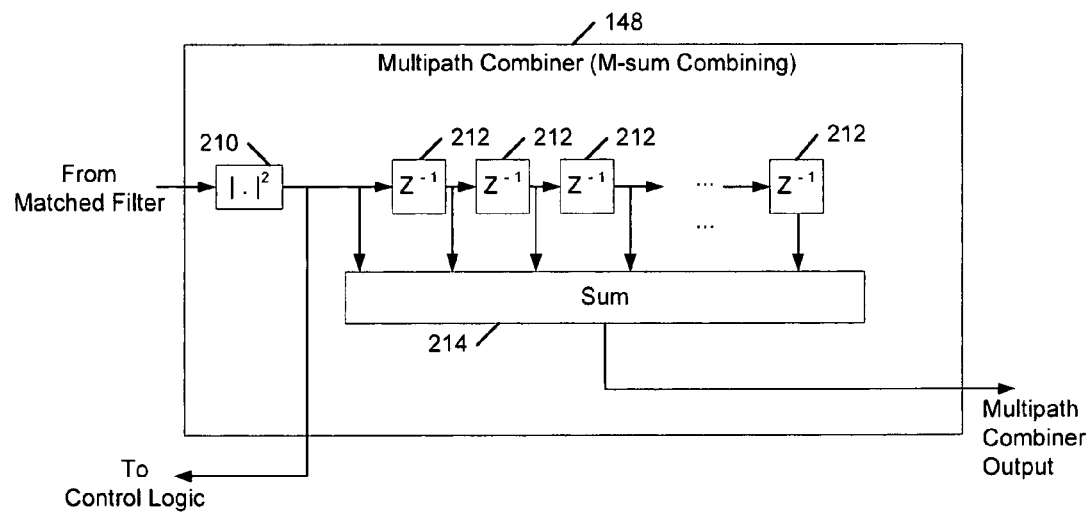
FIG. 5a illustrates a multipath combiner according to an embodiment of the invention.

FIG. 5a illustrates a multipath combiner according to an embodiment of the invention. Combiner 148 of FIG. 5a is representative of combiner 148 of FIG. 3. Combiner 148 accepts the output of matched filter 146, and power unit (PU) 210 produces a magnitude squared representation of the output of filter 146. The output of PU 210 is passed through an M tap delay line with M−1 delay elements 212, where M is 20 in an embodiment and 40 in an alternative embodiment. In an alternative embodiment, M is a value that is selected from a range of possible choices by control logic 154. As indicated elsewhere herein, other values of M, greater than 20 and smaller than 20 are possible in alternative embodiments. The outputs of PU 210 and the delay elements 212 are summed by summer 214 and the sum produced by summer 214 is applied to peak detector 150.

In an embodiment, the output of PU 210 is also provided to CL 154 which identifies the index of the peak sample in the output, such as sample 401b of FIG. 6a which has an index of 138. CL 154 then performs coarse timing adjustment by setting the value in counter sampleCount 153 based upon the index of the peak sample and, M, the length of the multipath combiner. In an alternative embodiment, CL 154 determines a timestamp, as described elsewhere herein, and adjusts sampleCount 153 based upon the timestamp.

CL 154 does the foregoing 'coarse' timing adjustment for some symbols that are received during the packet detection phase. In an embodiment, the coarse timing adjustment is performed only one time during the packet detection phase. As described in greater detail elsewhere herein, in an alternative embodiment, CL 154 performs interim fine timing adjustment during a subsequent fine parameter estimation phase.

Figure 5B:
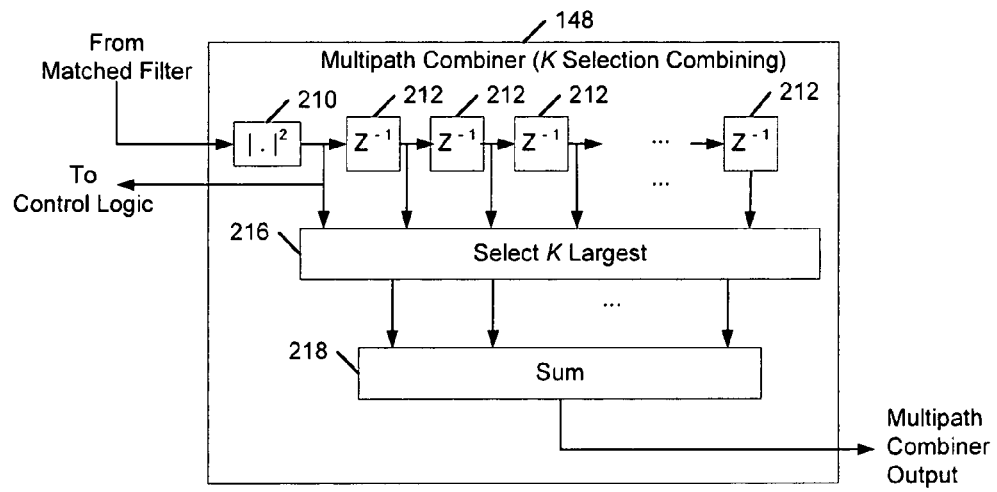
FIG. 5b illustrates a multipath combiner according to an alternative embodiment of the invention.

FIG. 5b illustrates a multipath combiner according to an alternative embodiment of the invention. Combiner 148 of FIG. 5b is representative of combiner 148 of FIG. 3. Combiner 148 accepts the output of matched filter 146, and power unit 210 produces a magnitude squared representation of the output of filter 146. The output of power unit 210 is passed through an M tap delay line with M−1 delay elements 212, where M is 20 in an embodiment. As indicated elsewhere herein, other values of M, greater than 20 and smaller than 20 are possible in alternative embodiments; one of ordinary skill in the art would recognize that M is an implementation-dependent detail that can be set without undue experimentation. The K largest valued samples out of the M sample outputs of power unit 210 and the delay elements 212 are selected by largest-K-samples-out-of-M-samples selector 216. The K largest valued samples selected by selector 216 are summed by summer 218. The sum produced by summer 218 is applied to peak detector 150. In an embodiment, the output of PU 210 is also provided to CL 154 which identifies the index of the peak sample in the output, such as sample 401b of FIG. 6a which has an index of 138. CL 154 then performs coarse timing adjustment based upon the index of the peak sample by adjusting the value in counter sampleCount 153 as described elsewhere herein.

Referring to process 700 of FIG. 8, CL 154 sets 701a counter, symbols_processed, to zero, and a limit, MaxSymbols_Process, in an embodiment, to an integer value greater than or equal to 1 and less than the number of symbols in the packet synchronization sequence. CL 154 sets Found_Valid_1st_Peak, a flag indicative of whether an initial condition for packet detection has been satisfied, to FALSE. MaxSymbols_Process is a limit on the number of symbols that are processed before a packet detection determination is made. The symbols_processed counter keeps count of the number of symbols that have been processed as process 700 is performed.

In an alternative embodiment, MaxSymbols_Process is set to 6, but as indicated elsewhere herein other values smaller or larger are also possible. The counter symbols_processed and MaxSymbols_Process are, depending upon the embodiment, software constructs stored in MEM 156 or hardware registers (not shown) accessible to or included in control logic 154.

Based on received signal samples and a stored reference signal, MF 146 produces, a match indication, an output 702 that is indicative of the degree with which the received signal samples match a stored reference signal. In an embodiment, the stored reference signal is stored synchronization sequence sample values such as those described elsewhere herein. The output of MF 146 is applied to multipath combiner (MPC) 148 which produces 704 based upon the match indication a multipath combined signal that allows for a more accurate determination of symbol timing.

Due to the effects of multipath, the sample index of a peak sample in the squared output of a matched filter may not be an accurate representation of when an entire synchronization symbol has been received. A multipath combiner decreases the unfavorable effect of multipath on determining timing from received signal samples. In an embodiment, the received signal samples are a synchronization symbol.

In an embodiment, MPC 148 is a low-pass filter with M taps, where M is an integer, and provides at its output the sum of the M most recent samples at its input. In an embodiment, M is selectively set by CL 154 to 40 but other values, greater or smaller, are encompassed by alternative embodiments and one of ordinary skill in the art would appreciate that M is a design implementation that can be defined without undue experimentation.

Referring to FIGS. 4 & 8, PD 150 identifies 706 the location of a peak in the output of MPC 148 that satisfies a condition based upon parameters provided by CL 154. In an embodiment, CL 154 generates the parameters based upon signal and noise strength measurements, such as received signal strength indication (RSSI) and/or noise variance, respectively, by FE 142. The parameters generated by CL 154 include: multipath combining threshold (mpc_th), rising threshold (th_rise), and falling threshold (th_fall). A peak is defined as the output sample of MPC 148 that has the largest value in between the rising threshold sample and the falling threshold sample. This condition is illustrated in FIG. 6b by peak sample 402b at index 153 that is between the rising threshold sample 410a at index 138 and the falling threshold sample at index 163.

PD 150 searches 706 for an output sample that is a peak that is between the rising threshold sample and the falling threshold sample. PD 150 then determines 708 whether Found_Valid_1st_Peak is FALSE. When Found_Valid_1st_Peak is FALSE, PD 150 determines 707 whether the peak output sample produced by MPC 148 has an associated power, peak_pwr_n, greater than or equal to the multipath combining threshold, mpc_th. The foregoing condition is referred to as the initial packet detection condition which in some cases—when satisfied for some TFCs—may lead to band switching. When the peak_pwr_n is greater than or equal to mpc_th, PD 150 provides 710 the peak output sample's peak_pwr_n and sample index, peak_idx_n, to MBC 152 and PD 150 sets Found_Valid_1st_Peak to TRUE if it were FALSE. The 'n' in peak_idx_n and peak_pwr_n is the value in counter symbols_processed plus 1 and indicates that the peak sample's sample index, peak_idx_n, and the peak sample's power, peak_pwr_n, are associated with the $n^{th}$ symbol.

When the peak sample's peak_pwr_n is less than mpc_th, process 700 returns to MF 146 producing 702, for additional received signal samples, an output that is indicative of the degree with which the received symbol samples match the stored reference signal.

When Found_Valid 1st_Peak is TRUE, PD 150 provides 710 the peak output sample's peak_pwr_n and sample index, peak_idx_n, for symbol n, to MBC 152 and PD 154 sets Found_Valid_1st_Peak to TRUE if it were FALSE. In an alternative embodiment, as described elsewhere herein, PD 150 does not provide the peak sample's peak_idx_n or peak_pwr_n to MBC 152 if a condition (or alternatively one or more conditions) is not met.

When the peak sample's peak_pwr_n is equal to or greater than mpc_th, PD 150 provides 710 the peak output sample's peak_pwr_n and sample index, peak_idx_n, for symbol n, to MBC 152 and PD 154 sets Found_Valid_1st_Peak to TRUE if it were FALSE. In an alternative embodiment of process 700, when peak_pwr_1 is greater than or equal to mpc_th, MBC 152 declares that a packet has been received.

Control logic 154 determines 712 whether the counter symbols_processed indicates that the MaxSymbols_Process limit has been reached. When MaxSymbols_Process limit has not been reached, control logic 154 increments 714 counter symbols_processed. Control logic 154 then determines 716 whether the TFC hypothesis indicates the receiver can now switch to another band or whether it should remain in the current band. When the TFC hypothesis does not indicate that band switching is necessary, continuing with process 700, based on additional received signal samples and the stored reference signal, MF 146 produces additional output 702 that is indicative of the degree with which additional received signal samples match the reference signal. Process 700 continues as described above.

In an embodiment, when the TFC hypothesis indicates band switching is necessary, control logic 154 instructs 718 FE 142 to switch to another band as required by the TFC hypothesis. Continuing with process 700, based on additional received signal samples and the stored base synchronization sequence values, MF 146 produces additional output 702 that is indicative of the degree with which additional received signal samples match the stored reference signal. Process 700 continues as described above.

When MaxSymbols_Process limit is reached, MBC 152 determines 722 whether the sum, sum_peak_power, of at least some of the peak_pwr_n values received from PD 150 exceeds or equals mbc_th, a threshold value set by CL 154 based on channel conditions determined via FE 142, in an embodiment. Calculation of sum_peak_power is described in greater detail below in connection with the description of FIG. 7a.

When the sum of at least some of the peak_pwr_n values received exceeds or equals mbc_th, MBC 152 generates, as described in greater detail below, an indication that a packet has been detected. In an alternative embodiment, peak detector 150 provides an indication that a packet has been detected. In an alternative embodiment, peak detector 150 may generate a packet detection indication after detecting the first peak with peak_pwr_1. In an alternative embodiment, MBC 152 may generate a packet detection indication after receiving the first peak power from PD 150, peak_pwr_1.

When the sum of at least some of the peak_pwr values received is less than mbc_th, CL 154 makes 720 another TFC-timing hypothesis. For example, in the case where CL 154 considered the TFC timing hypothesis to be {1, 2, 2, 3, 3, 1} (where the TFC is {1, 1 2, 2, 3, 3,}) and did band switching accordingly, the mbc_th, if properly set, will not be exceeded by the sum of the peak_pwr values received. In such a case, process 700 will continue to use the synchronization sequence values stored in MF 146 but will switch bands according to {1, 1, 2, 2, 3, 3,}. CL 154 then sets 701a counter, symbols_processed, to zero, a limit, MaxSymbols_Process, in an embodiment, to an integer value greater than or equal to 1, and Found_Valid_1st_Peak, a flag indicative of whether an initial condition for packet detection has been satisfied, to FALSE, and process 700 continues as described. In an alternative embodiment, CL 154 loads 722 MF 146 with different synchronization sequence values than that were used in the initial pass through process 700. This point will be made clearer in the immediately following discussion.

The band to which FE 142 switches depends upon the TFC hypothesis made by CL 154. In an embodiment, CL 154 makes the TFC hypothesis based upon the synchronization sequence that is received because there is a one-to-one mapping between a particular TFC and a particular synchronization sequence. However, there may be an ambiguity in some instances as described elsewhere herein in which case CL 154 may try more than one TFC, and more than one synchronization sequence or reference signal, in order to detect a packet. In an alternative case, the TFC may be fixed but the timing may be ambiguous, in which case CL 154 adjusts receiver timing so that the receiver is in phase with the TFC used by the transmitter. The foregoing correctly suggests that an improper TFC hypothesis or improper timing alignment with the correct TFC is not likely to result in a packet detection signal being generated.

In an alternative embodiment, the synchronization sequence of a received initial synchronization symbol may result in ambiguity in the TFC-timing hypothesis even though the hopping pattern (TFC) is known. In such a situation it sometimes may not be possible for a receiver such as receiver 140 to determine definitively the timing within a received sequence for a particular TFC until more symbols are received and processed by receiver 140.

Referring to FIG. 2c, a receiver, such as receiver 140, may start tuning to band 1 when symbol 127b is being received. In an embodiment in which the received synchronization sequence for symbol 127a is indistinguishable from the synchronization sequence for symbol 127b, CL 154 is unable to determine at the conclusion of receipt of symbol 127b whether it should instruct FE 142 to switch to band 2 or remain tuned to band 1. In this case, in an embodiment, CL 154 instructs FE 142 to switch to band 2, and, in an alternative embodiment, instructs FE 142 to remain in band 1. In an embodiment in which FE 142 remains in band 1 after receipt of symbol 127b, the output of MPC 148 should not generate a peak that satisfies the condition and parameters provided by CL 154 to PD 150.

Figure 7A:
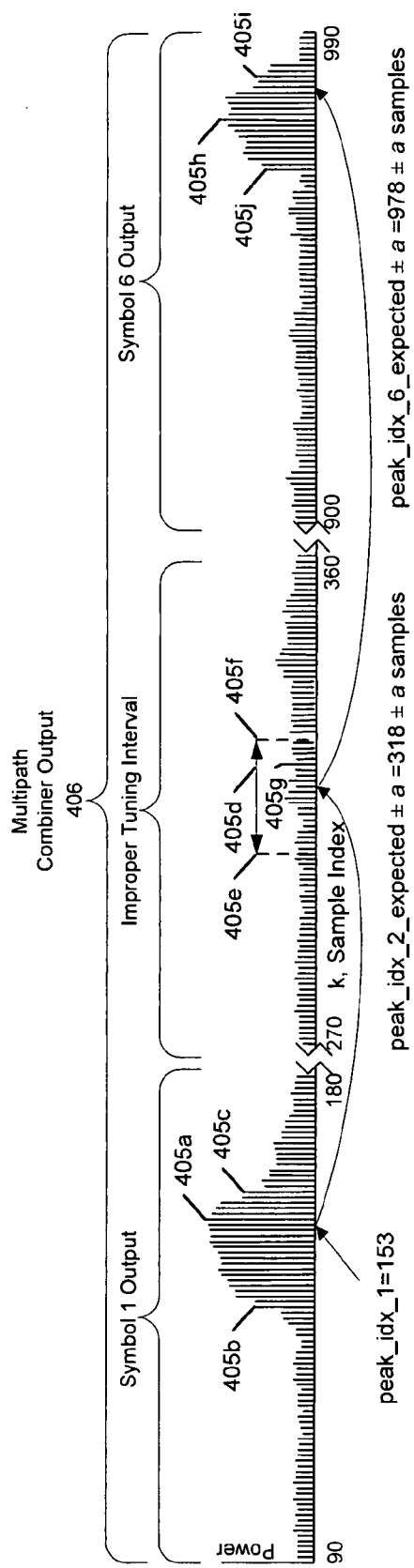
FIG. 7a illustrates the multipath combiner output for multiple synchronization symbols for cases where an incorrect decision was made with regards to switching bands or remaining in a band.

FIG. 7a illustrates the multipath combiner output for multiple synchronization symbols for cases where an incorrect decision was made with regards to switching bands or remaining in a band. Output 406 is a hypothetical output provided for purposes of illustration. MPC output 406 represents the output for two synchronization symbols and an improper tuning interval when—depending upon the case—a receiver either switched to an improper band or remained in an improper band. Assuming Symbol 1 Output represents the output of MPC 148 for symbol 127b of FIG. 2c, output 406 includes a peak 405a that exists between rising threshold sample 405b and falling threshold sample 405c and that exceeds mpc_th. The value for $k_{max}$ (or peak_idx_1), the index sample value at which a peak is found, is 153. Given that each symbol is 165 samples in length, the next peak's index, peak_idx_2, should be found in the vicinity of output sample 318, or more precisely in a window defined by peak_idx_2_expected±a (318±a), where peak_idx_2_expected=peak_idx_1+1*165, where '1' represents the location of the symbol—producing a peak at peak_idx_2— in the sequence of received symbols relative to the symbol associated with peak_idx_1. The peak for the $k^{th}$ symbol after the symbol that produced a peak at peak_idx_1 can be found in the range defined by peak_idx_1+k*165±a, where k is an integer that represents the location of the symbol (first, second, third, etc. . . . in the sequence of received symbols relative to the symbol associated with peak_idx_1 and n is equal to k+1. The value of a is set by CL 154 based upon channel conditions and MPC length M.

In an embodiment, MBC 152 sums the peak_pwr_n values received from PD 150 for multiple symbols only when the peak_pwr_n for a symbol occurs in the 'validity window' associated with the symbol, where the 'validity window' is [peak_idx_1+k*165−a, peak_idx_1+k*165+a]. In an alternative embodiment, PD 150 provides a null value or alternatively no value when the peak_pwr_n associated with a symbol does not occur in the 'validity window' associated with the symbol. In such an alternative embodiment, PD 150 determines whether the peak_pwr_n associated with a symbol occurs in the 'validity window' and MBC 152 sums the values of peak_pwr that it receives. The foregoing three embodiments correctly indicate that functionality, other than and including the one immediately described above, can be distributed among various units of receiver 140 and other receivers or units described herein to produce alternative embodiments, and given the teachings disclosed herein and the expected knowledge and skills one of ordinary skill in the art, one of ordinary skill in the art would be expected to understand how to make and use such alternative embodiments without undue experimentation.

One of ordinary skill in the art would appreciate that a is defined to work under a variety of channel conditions and SNR, and one of ordinary skill in the art would appreciate that it can be defined without undue experimentation. In an embodiment, a is 10, but other values greater or less than 10 are also possible in alternative embodiments.

For the case where FE 142 does not switch from band 1 to band 2 after symbol 127b is received, the output of MPC 148 during the Improper Tuning Interval does not satisfy the condition and parameters provided to PD 150 which are partly represented by the dashed lines for rising threshold sample 405e and falling threshold sample 405f. Assuming a is 10, there is no MPC 148 output sample in the range peak_idx_2_expected±10 which crosses solid line 405d with double arrows. In such a case, CL 154 determines that it was improper to remain in band 1 after symbol 127b is received. Consequently, CL 154, depending upon the embodiment, either has FE 142 remain in band 1 until symbol 128a is received or, alternatively, instructs FE 142 to switch to band 2. In an embodiment, PD 150 does not provide to MBC 152 peak_pwr_2 and peak_idx_2, (peak_idx_2=322), associated with peak 405g because peak_pwr_2 does not exceed threshold mpc_th. For the general case and not just the case illustrated in FIG. 7a, in such an embodiment, PD 150 does not provide to MBC 152 peak_pwr_n and peak_idx_n when peak_pwr_n does not exceed threshold mpc_th. However in an alternative embodiment, for the general case and not just the case illustrated in FIG. 7a, PD 150 does provide peak_pwr_n and peak_idx_n, even though peak_pwr_n does not exceed threshold mpc_th.

Assuming CL 154 has FE 142 remain in band 1 until symbol 128a is received and the Symbol 6 Output represents the output of MPC 148 for symbol 128a of FIG. 2c, output 406 includes a peak 405h that exists between rising threshold sample 405j and falling threshold sample 405i. PD 150 searches for peak 405h. PD 150 provides peak_pwr_3 and peak_idx_3, (peak_idx_3=973) associated with peak 405h to MBC 152.

Referring again to FIG. 7a and process 700 of FIG. 8, MBC 152 sums 722 the peak_pwr_n values associated with each of peak_idx_1, peak_idx_2, and peak_idx_3 to determine 722 sum_peak_power, if each peak_pwr_n satisfies an associated validity condition. Specifically, MBC 152 determines 722 whether peak_idx_n for an associated peak_pwr_n is within the range defined by peak_idx_1+k*165±a, the peak validity window. In an embodiment, only when the peak_idx_n for an associated peak_pwr_n is within the associated validity window is the associated peak_pwr used 722 by MBC 152 to calculate sum_peak_power. MBC 152 then determines 722 whether sum_peak_power is greater than or equal to multiband combining threshold, mbc_th, a threshold value that is provided by control logic 154 to MBC 152. One of ordinary skill in the art would appreciate that the value of mbc_th can be set without undue experimentation and that it is selected based upon simulation/experiment results to achieve a given target performance, e.g., false alarm probability and miss detection probability, and it can be dependent on RSSI and/or SNR, and MaxSymbols_Process. In an alternative embodiment, MBC 152 determines whether sum_peak_power is greater than mbc_th.

When sum_peak_power is greater than or equal to mbc_th, MBC 152 indicates to control logic 154 that a packet has been identified by setting 724 packet detected to TRUE. When sum_peak_power is less than mbc_th, MBC 152 indicates 720 to control logic 154 that a packet has not been identified by setting packet detected to FALSE and CL 154 makes 720 another TFC-timing hypothesis. For example, if CL 154 assumed that for TFC {1, 1, 2, 2, 3, 3} the correct TFC-timing hypothesis was {1, 2, 2, 3, 3, 1} CL 154 would try {1, 1, 2, 2, 3, 3} next. The foregoing is an illustrative example to describe one case of many cases for an embodiment of the invention, and the invention is not to be limited to this one case, the particular TFC used in the example, or similar cases or the embodiment just described.

While in the foregoing description, MBC 152 sums the peak_pwr_n values for the MPC 148 output for three synchronization symbols, one of ordinary skill in the art would appreciate that the peak_pwr_n values associated with more (or alternatively less) than three synchronization symbols may be summed in order for MBC 152 to make the packet detection determination. In an alternative embodiment, the peak_pwr_n values associated with between three synchronization symbols and six synchronization symbols is summed by MBC 152 in order for MBC 152 to make the packet detection determination.

Figure 7B:
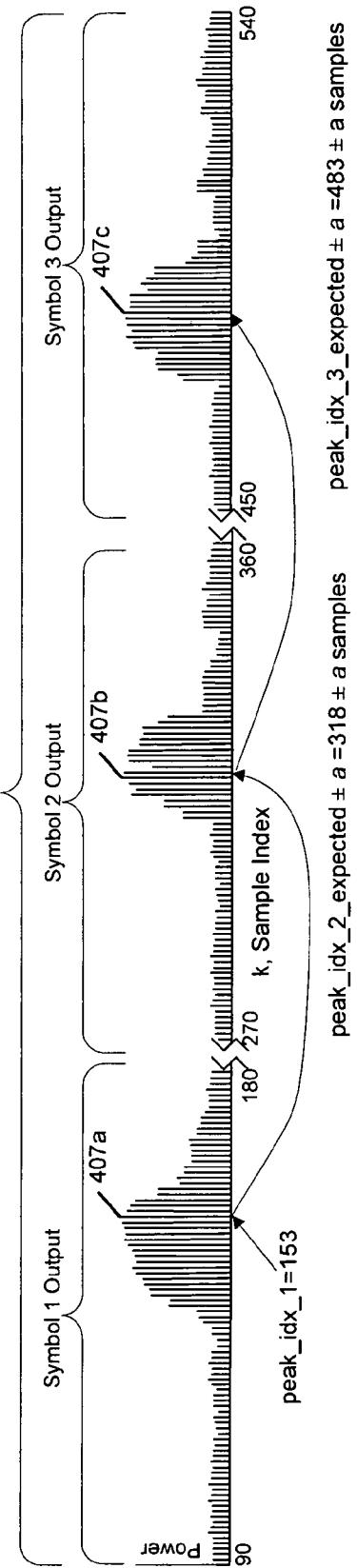
FIG. 7b illustrates the multipath combiner output for multiple synchronization symbols according to an embodiment.

FIG. 7b illustrates the multipath combiner output for multiple synchronization symbols according to an embodiment. Output 408 is a hypothetical output provided for purposes of illustration. MPC output 408 represents the output for three synchronization symbols for the case where FE 142 makes the appropriate band switching at the appropriate time or where three synchronization symbols are sent sequentially within a single band.

Control logic 154 also determines a timestamp which is a basis for identifying the starting samples for performing FFTs in order to decode subsequent OFDM symbols. This point will be made clearer from the following description.

The timestamp is a function of $k_{max}$ which is defined by the following two equations:

$$k_{max} = \arg \max_{k \in A} y_k \qquad \text{Eqns. 1}$$
$$= \arg \max_{k \in A} \sum_{j=k-M+1}^{k} |x_j|^2,$$

where A is the range of indices set for the peak window (i.e., window in which peak is found) defined by the two thresholds, th_rise and th_fall, $y_k$ is the output of MPC 148 at sample index k and is dependent upon the sum of the squares of the amplitudes of the output samples, $x_j$, of MF 146, where j is in the range between [k−M+1, k]. The value of $k_{max}$ identifies the sample in the output of MPC 148 which has the greatest power associated with it. In FIG. 6b, $k_{max}$ is 153 because the peak sample 402b occurs at index 153.

For an embodiment, the timestamp is determined by the following equation:

$$\text{timestamp} = k_{max} - M + N_{ZPS} + 2, \qquad \text{Eqn. 2}$$

where M is the number of taps in MPC 148, and $N_{ZPS}$ is the number of samples in the zero-padded suffix. In an embodiment, $N_{ZPS}$ is 37, but the invention is not limited to any particular values for $N_{ZPS}$ and M.

When there is a peak sample that satisfies the initial packet detection condition, the value calculated for timestamp identifies the index of the first sample for the next symbol.

FIG. 9a illustrates placement of an FFT based on timestamp value according to an embodiment. In an embodiment, ADC samples 800 are stored in data memory (DMEM) 157. Samples 800 are hypothetical samples provided for purposes of illustration. For the case illustrated in FIG. 9a, timestamp is determined to be 169 for the last symbol in the packet synchronization and frame synchronization sequence. For the packet architecture of FIG. 1a, the seventh symbol after the last symbol in the packet synchronization and frame synchronization sequence is a PLCP header symbol that will require an FFT to be performed on its samples by an FFT logic unit (not shown) coupled to ADC 144. ADC 144 produces 165 samples for the first PLCP header symbol. The 165 samples are used by an overlap-and-add (OLA) unit (not shown) to produce 128 samples for which the FFT logic unit performs an FFT. Channel equalization is then performed on the FFT output. In an embodiment, an FFT logic unit (not shown) is coupled to ADC 144.

Selection of the appropriate 128 samples from MEM 156 for use by the FFT logic unit is made based on the value of timestamp. Given that each symbol comprises 165 samples and timestamp is 169, control logic 154 determines that the seventh symbol, which is the first symbol, of the PLCP header begins at the 6*165+timestamp=$1159^{th}$ sample and extends to the 1159+127=$1286^{th}$ sample. The $1287^{th}$ sample to $1323^{rd}$ sample are the ZPS samples. The OLA unit performs an overlap-add-operation using some of the ZPS samples and the some of the first few samples after the $1158^{th}$ sample and provides 128 samples to the FFT logic unit. Similar timestamp determination and OLA processing is performed for channel estimation symbols in an embodiment. Fine timing estimation, which is described in greater detail elsewhere herein, may also be performed for channel estimation symbols.

While in an embodiment as shown in FIG. 7a timestamp is calculated based on the multipath combiner output associated with one synchronization symbol, in an alternative embodiment timestamp is calculated based on the multipath combiner output associated with two or more synchronization symbols which may have been received in one or more bands.

FIG. 9b illustrates determination of a timestamp value according to an alternative embodiment. In FIG. 9b, the multipath combiner 148 output for Symbol A 806, Symbol B 808, and Symbol C 810 is averaged after 'alignment' of the output associated with each symbol based on the timestamp values calculated for each symbol independently. Outputs 806, 808, 810, and 812 are hypothetical outputs provided for purposes of illustration.

Alternatively, the alignment is made based upon the first timestamp, e.g., timestamp associated with Symbol A. In an alternative embodiment, the squared output of a matched filter such as matched filter 146 is averaged for several symbols and the averaged squared output is provided to MPC 148 for multipath combining. A value for timestamp is then determined by CL 154 based on the output of MPC 148 that is due to the averaged squared output of MF 146. Peak detection, in an alternative embodiment, can also be performed by PD 150 on the output of MPC 148 that is due to the averaged squared output of MF 146. In an alternative embodiment, averaging over synchronization symbols can be limited to synchronization symbols received in the same band. In an alternative embodiment, averaging is performed over multiple synchronization symbols in different bands. The averaging for each of the foregoing alternative embodiments is performed by the control logic of an alternative embodiment, such as CL 154.

In one case, multipath combiner 148 output for Symbol A 806, Symbol B 808, and Symbol C 810 is due to the last three symbols in the packet synchronization and frame synchronization sequence, but they can also be due to other symbols in other cases and the symbols need neither be consecutive (following each other but in different bands) nor contiguous (following each other but in the same band).

The timestamp value for multipath combiner 148 output associated with Symbol A 806 is 169. The timestamp value for multipath combiner 148 output associated with Symbol B 808 is 332. The timestamp value for the output associated with Symbol C 810 is 501. In embodiment, CL 154 averages the values of the output samples at indices 168, 331, and 500 stores the average at entry 500 in an array (not shown) in MEM 156 that has indices from 336 to 500. The values of the output samples at indices 167, 330, and 499 are also averaged by CL 154 and the average is stored at entry 499 and so forth down to samples in the output of multipath combiner 148 with indices 4, 167, and 336.

CL 154 then identifies the peak 812 in the averaged output which is at index 480 and using $k_{max}$=480 calculates timestamp to be 499. Subsequent FFT placement is made using 499 for the value of timestamp.

Figure 10:
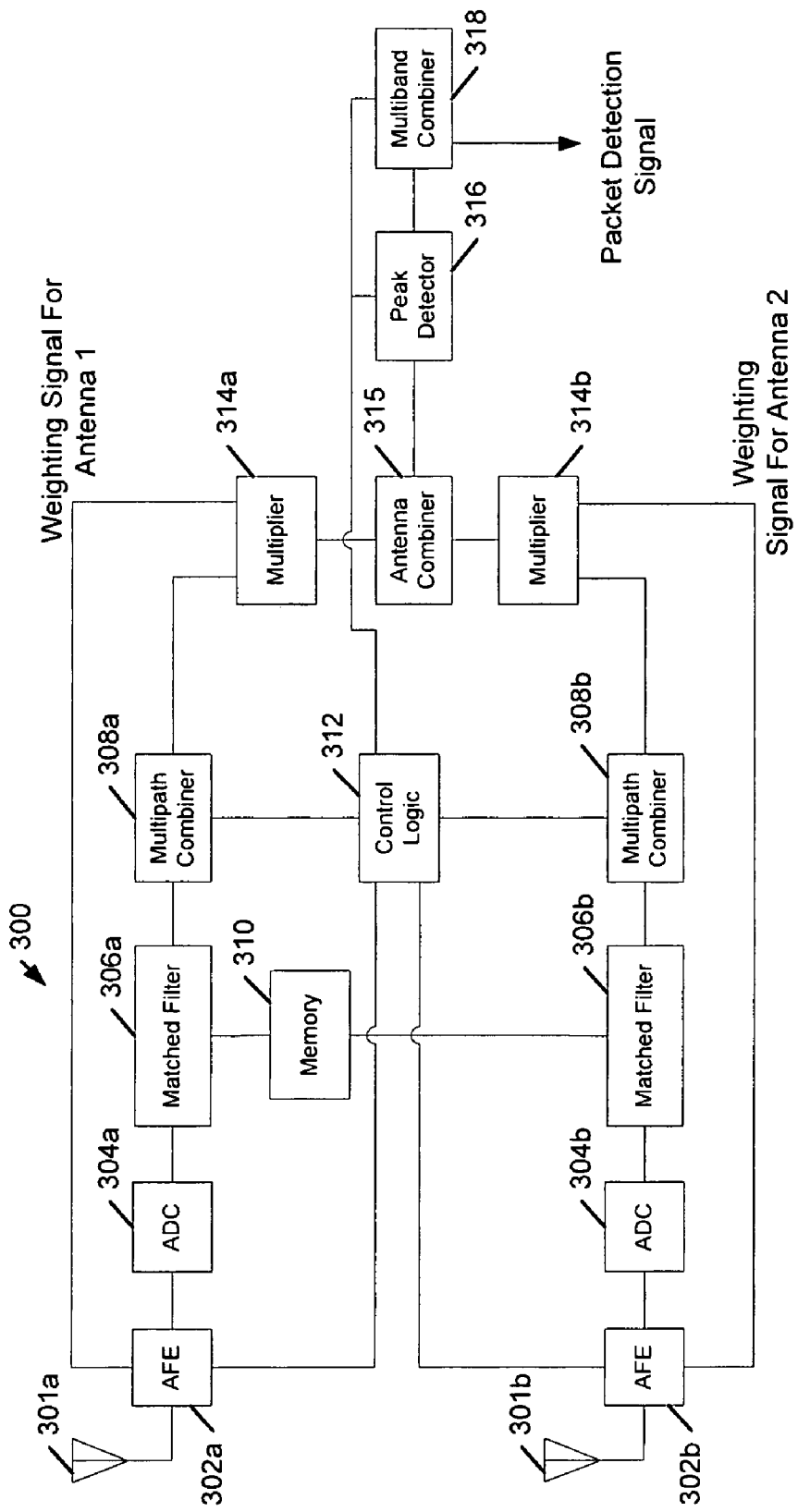
FIG. 10 illustrates a block diagram of a multi-antenna receiver that performs packet detection according to an alternative embodiment of the invention.

FIG. 10 illustrates a block diagram of a multi-antenna receiver that performs packet detection according to an alternative embodiment of the invention. Receiver 300 performs packet detection. Receiver 300 represents an embodiment of the invention that detects packets and includes one or more units which can be substituted with other one or more other units as described elsewhere herein to create alternative embodiments which also perform packet detection.

Receiver 300 includes antennas (ANTs) 301a, 310b which receive radio frequency (RF) signals from a transmitter (not shown) such as the one of device 111a and provides them to front ends (FEs) 302a, 302b, respectively, for amplification, down-conversion (if necessary) and gain control. Front ends 302a, 302b provide to their respective analog-to-digital converter (ADC) 304a, 304b a baseband, low-pass filtered signal based on the received RF signal. Each of ADCs 304a, 304b samples its respective low-pass filtered signal and provides the samples to its respective matched filter 306a, 306b. Matched filters 306a, 306b operate as MF 146 described above in connection with FIG. 3, and, in alternative embodiments, alternatives of MF 146 described elsewhere herein. Such description is incorporated herein. In an embodiment, matched filters 306a, 306b each receives from memory (MEM) 310 values of a synchronization base sequence to be used for 'comparison' with the received samples. In an embodiment, control logic (CL) 312 loads MFs 306a, 306b with the stored values for a base synchronization sequence.

Multipath combiners 308a, 308b operate as MPC 148 described above in connection with the description of FIG. 3, and, an in alternative embodiments, alternatives of MPC 148 described elsewhere herein. Such description is incorporated herein. Similarly, CL 312 operates in a manner similar to CL 154, and the description of CL 154 elsewhere herein is incorporated here.

The output of MBC 308a is applied to multiplier 314a which receives a weighting signal from FE 302a. The weighting signal is inversely proportional to the gain applied by a gain control circuit (not shown) in FE 302a to the RF signal received by antenna 301a. Multiplier 314a multiplies the output of MPC 308a by the weighting signal to produce a weighted multipath combiner 308a output that is applied to antenna combiner 315.

The output of MPC 308b is applied to multiplier 314b which also receives a weighting signal from FE 302b. The weighting signal is inversely proportional to the gain applied by a gain control circuit (not shown) in FE 302b to the RF signal received by antenna 301b. Multiplier 314b multiplies the output of MBC 308b by the weighting signal to produce a weighted multipath combiner 308b output that is applied to antenna combiner 315. In an alternative embodiment, the antenna weighting can be implemented after ADC 144 or, alternatively, after MF 146.

The effect of the weighting signals and multipliers 314a, 314b is to give less emphasis to the receiver path that is receiving a weak RF signal that requires relatively larger gain at either of antennas 301a, 301b. The outputs of MPC 308a, 308b are summed by antenna combiner 315, and the sum of antenna combiner 315 is applied to peak detector 316.

PD 316 operates as PD 150 which was described above in connection with FIG. 3, and such description is incorporated herein. Similarly, multi-band combiner 318 operates as MBC 152 described above in connection with FIG. 3, and such description is incorporated herein. The processes described elsewhere herein are applicable to one or more embodiments of receiver 300 and one of ordinary skill in the art would appreciate that any modifications or additions can be made without undue experimentation.

While in the foregoing description only two antennas were illustrated and described, one of ordinary skill in the art would readily appreciate that the invention is not limited to two antennas but encompasses alternative embodiments including three or more antennas, and alternative embodiments that can selectively activate to two or more antennas when there are more than three antennas available. Furthermore, one of ordinary skill in the art would appreciate how the alternative embodiments can be made and used without undue experimentation.

While in the foregoing description, especially with regards to FIGS. 6a, 6b and Eqns. 1, the technique for determining the peak sample was based on finding the peak sample within a peak window whose index boundaries were defined by the indices of samples whose values correspond to th_rise and th_fall. When the multipath combiner has a combining window or length that is greater than or much greater than the channel length (L) (measured in samples), there may be multiple samples within the peak window which have associated power values that are very close to the highest power value in the peak window. Consequently, an alternative technique for determining the timestamp for FFT placement is also described herein. The alternative technique also allows for an estimate of the channel length or delay to be made.

It may be beneficial to estimate the channel length during the packet/frame synchronization phase of receipt of the preamble because it allows for a better channel frequency response (or impulse response) estimate to be made during the receipt of the channel estimation symbols.

Figure 11A:
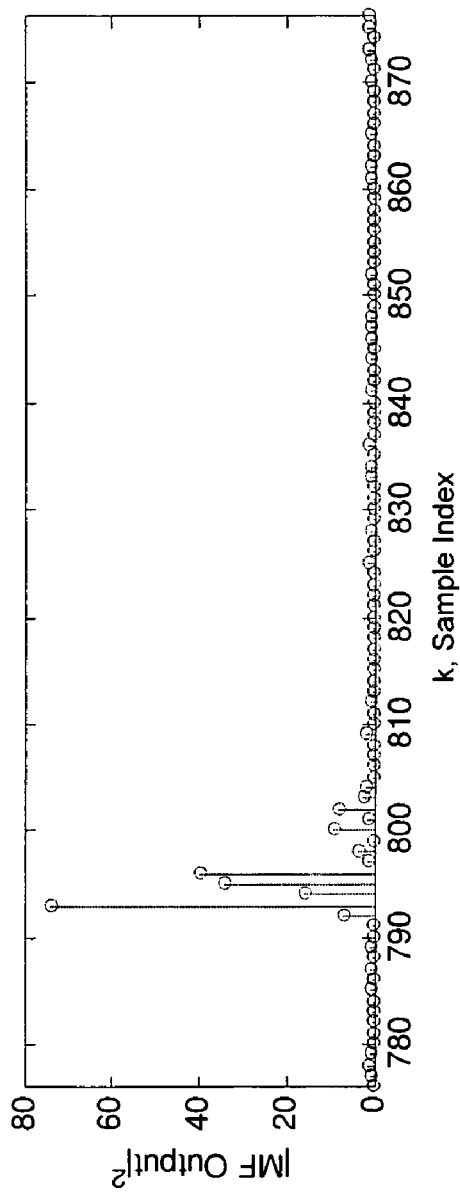
FIG. 11a illustrates another example of the magnitude squared output of a matched filter according to an embodiment.

FIG. 11a illustrates another example of the magnitude squared output of a matched filter according to an embodiment. The magnitude squared output of a matched filter has a fairly prominent peak, as shown in FIG. 11a, when the received samples are similar to the stored synchronization sequence. The magnitude squared output of FIG. 11a is a result of simulation and provided for purposes of illustration.

Figure 11B:
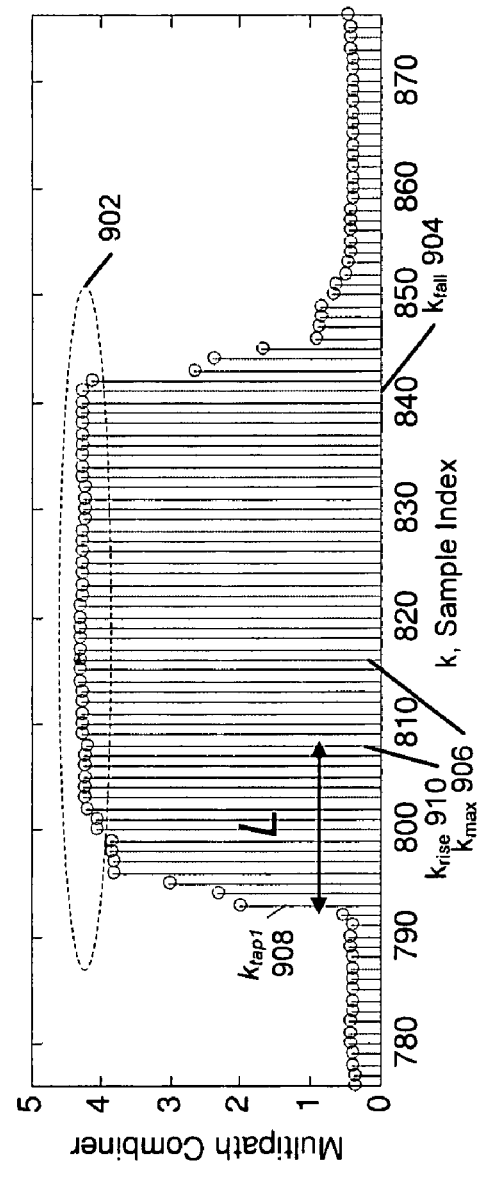
FIG. 11b illustrates the output of a multipath combiner according to an embodiment.

FIG. 11b illustrates the output of a multipath combiner according to an embodiment. FIG. 11b illustrates the case where the multipath combiner has a combining window or length M that is greater than the channel length (L) or delay measured in samples. When M is greater than L or much greater than L the expected peak is smeared to form a plateau illustrated by plateau 902. The multipath combiner output of FIG. 1b is a result of simulation and is provided for purposes of illustration.

Peak detector 150 identifies the peak sample in plateau 902 and, in an embodiment, provides the index and power of the peak sample to CL 154. The index and the power of the peak sample is used by CL 154 to identify the 'falling edge' sample and the 'rising edge' sample of the characteristic substantially plateau shape produced by the output of MPC 148. The timestamp for FFT placement and the channel length estimate can then be determined from the indices of the 'falling edge' sample and the 'rising edge' sample. The 'falling edge' sample's index $k_{fall}$ can be determined through either of the following relationships, where $0 < p_{fall} \leq 1$ and is set to 0.9 in an embodiment:

$$k_{fall} = \min\{k \geq k_{max} : z_k < p_{fall} z_{max}\} - 1 \qquad \text{Eqn. 3}$$

$$k_{fall} = \max\{k \geq k_{max} : z_k \geq p_{fall} z_{max}\} \qquad \text{Eqn. 4}$$

where $z_k$ is the output of MPC 148 at sample index k and $k_{max}$ is the index of the sample in the plateau of output samples that has the largest value (e.g., $k_{max}$ 906 in FIG. 11b), and $z_{max}$ is the power value associated with sample at index $k_{max}$.

In an alternative embodiment, CL 154 determines the timing index, $k_{tap1}$, in terms of $k_{fall}$ and the length of the multipath combiner, M, as given by the following equation:

$$k_{tap1} = k_{fall} - M + 1. \qquad \text{Eqn. 5}$$

The timestamp for FFT placement in terms of $k_{tap1}$ is equal to $k_{tap1} + N_{ZPS} + 1$. In an embodiment, CL 154 determines the index of the sample that defines the rising edge, $k_{rise}$, through either of the following relationships, where $0 < p_{rise} \leq 1$ and is set to 0.9 in an embodiment:

$$k_{rise} = \min\{k \leq k_{max} : z_k \geq p_{rise} z_{max}\} - 1 \qquad \text{Eqn. 6}$$

$$k_{rise} = \max\{k \leq k_{max} : z_k < p_{fall} z_{max}\} \qquad \text{Eqn. 7}$$

In FIG. 11b, $k_{rise}$ 910 is between $k_{tap1}$ 908 and $k_{max}$ 906. In an embodiment, CL 154 determines the channel length estimate, $L_{est}$, as defined by the following equation:

$$L_{est} = k_{rise} - k_{tap1} + 1. \qquad \text{Eqn. 6}$$

As indicated elsewhere herein in connection with the descriptions of FIG. 1a and FIG. 2a, among other figures, the preamble includes a channel estimation sequence of symbols such as symbols 124a-c of FIG. 2a. The symbols of the channel estimation sequence are used by a receiver, such as alternative embodiments of receivers 140 and 300, to derive an estimate of the channel frequency response or channel impulse response (either of which is referred to hereafter as "channel response estimate") in order to perform equalization on the data and header symbols that are received later.

By determining $L_{est}$ during the packet synchronization and frame synchronization phase of receiving a packet, receivers according to embodiments of the invention select a filter to use to derive a better channel response estimate. By determining at least one SNR estimate during the packet/frame synchronization phase of receiving a preamble or during the channel estimation phase of the preamble, receivers according to alternative embodiments of the invention select a filter to use to derive a better channel response estimate. In yet other alternative embodiments, both an SNR estimate and $L_{est}$ are used to select a filter for deriving a better channel response estimate.

The following description is made with reference to receiver 140, but one of ordinary skill in the art would appreciate that its teachings are also applicable to and can be made and used with receiver 300, other alternative embodiments of receivers described herein, or components including an embodiment of the invention, without undue experimentation.

FIG. 12a illustrates part of a receiver chain including a channel estimator according to an embodiment of the invention. Receiver chain 930 includes an overlap-and-add (OLA) unit 932 that receives from ADC 144 time domain samples of channel estimation symbols such as symbols 124a-c. In an embodiment, time domain samples for a symbol are averaged, on a per sample basis, with corresponding samples of a subsequent second symbol in the same band (e.g., symbol 125a), by an averaging unit (not shown) before arriving at OLA unit 932. For example, samples of symbol 124a are averaged with those of symbol 125a on a per-sample basis; samples of symbol 124b are averaged with those of symbol 125b on a per-sample basis; and the samples of symbol 124c are averaged with those of symbol 125c on a per-sample basis. In an alternative embodiment, the time domain samples are averaged by OLA unit 932 after an overlap-and-add operation is performed for the samples of each symbol.

FIG. 2d illustrates an overlap-and-add operation at a receiver according to an embodiment. As illustrated in FIG. 2d, OLA unit 932 receives both information symbol samples 51a and zero-padded suffix (ZPS) samples 51b of a received symbol 50. If the ZPS has $N_{ZPS}$ samples 51b and the information symbol 51a has $N_{FFT}$ samples, to perform an overlap-and-add operation OLA unit 932 adds $N_{OLA}$ ZPS samples 51c to the first $N_{OLA}$ samples of the information symbol preceding the ZPS, where $N_{OLA} \leq N_{ZPS}$. The remaining $N_{ZPS} - N_{OLA}$ samples of the ZPS are ignored. The $N_{FFT}$ samples of the information symbol—whose first $N_{OLA}$ samples have now had the first $N_{OLA}$ ZPS samples added to them—are provided to a receiver's FFT logic, such as FFT logic 934. In an alternative embodiment, some of an information symbol's $N_{FFT}$ samples are provided to FFT logic 934 before the $N_{OLA}$ ZPS samples are added to the first $N_{OLA}$ samples of the information symbol.

In an embodiment, the value of $N_{OLA}$ is set by control logic 154 and provided to OLA unit 932. In an embodiment, MEM 156 includes a lookup table (not shown) that maps values of $L_{est}$ to corresponding values of $N_{OLA}$. For example, in an embodiment, for $L_{est}$ equal to 12, $N_{OLA}$ may be 16; and for $L_{est}$ equal to 16, $N_{OLA}$ may be 21. CL 154 selects a value for $N_{OLA}$ from the lookup table based upon the value of $L_{est}$.

In an alternative embodiment, control logic 154 sets the value of $N_{OLA}$ to a minimum default value (e.g., 5) or $L_{est}$ whichever is greater. In another alternative embodiment, the value of $N_{OLA}$ may also be set by CL 154 based upon an SNR estimate received from FE 142.

The dynamic adjustment of the overlap-and-add length, $N_{OLA}$, can decrease the amount of noise introduced into information symbol samples. In at least some embodiments, the noise reduction is achieved by adding less than all the ZPS samples to the corresponding first samples of the symbol being received.

Channel estimator 936 includes multipliers 935 that multiply the FFT samples produced by FFT logic 934 with the complex conjugate of samples of the channel estimation symbol (not shown) stored in memory 156. The outputs of multipliers 935 are provided to channel response estimate filter unit 938 which filters the output of multipliers 935, y, with a filter whose coefficients are obtained from memory 156. After filtering, filter unit 938 produces a channel response estimate, ĥ(k), where, in an embodiment, $-61 \leq k \leq 61$. The operation of filter unit 938 can be compactly represented by ĥ=M ỹ, but that does not mean that in an embodiment it performs matrix-vector multiplication. The filter coefficients used by filter unit 938 depend on a filter selection made by control logic 154.

FIG. 12b illustrates a memory including a filter data structure for holding multiple channel response estimate filters according to an embodiment. Memory 156 includes depending upon the embodiment, two or more channel response estimate filters stored in filter data structure (FDS) 157. In an embodiment, a memory such as memory 156 of receiver 140 (or memory 310 of receiver 300) includes 2 or more filters that are selected by control logic 154 based upon one or more of the following: $L_{est}$ and SNR. In an embodiment, an SNR estimate is made by FE 142 and provided to CL 154. In an alternative embodiment, an SNR estimate is made by a dedicated baseband unit (not shown) based upon ADC 144 output and provided to CL 154. For relatively large values of $L_{est}$ or relatively high SNR, 'peaky' filters are used that combine neighborhood subcarrier components with weights that are concentrated on the current target subcarrier. Less 'peaky' filters are used for relatively low values of $L_{est}$ and relatively low SNR where less 'peaky' means that adjacent subcarriers are combined with higher weights.

FIG. 12c illustrates a process for generating a filtered channel response estimate according to an embodiment. While process 950 is described with reference to units of receiver 140, the description is applicable to receiver 300 and alternative embodiments of receiver 140 and receiver 300 described herein or components containing an embodiment of the invention described herein.

In process 950, a channel length estimate (CLE) is determined 952 by control logic 154. In an embodiment, the channel length estimate (CLE) is determined based upon the output of a multipath combiner for received synchronization symbols as described elsewhere herein. In embodiment, the channel length estimate is one that was derived during the packet detection phase. In alternative embodiment, the channel length estimate is one that was derived during a fine channel length estimation phase described in detail elsewhere herein.

One of ordinary skill in the art would appreciate that the invention is not limited to any particular technique for channel length estimation. Based upon the CLE and/or SNR estimate, control logic 154 selects a filter from FDS 157. In an alternative embodiment in which only the SNR estimate is used to select a filter, process 950 does not include operation 952. A channel response estimate filter unit 938 generates 954 a filtered channel response estimate based upon received channel estimation symbols and the selected filter.

Figure 13:
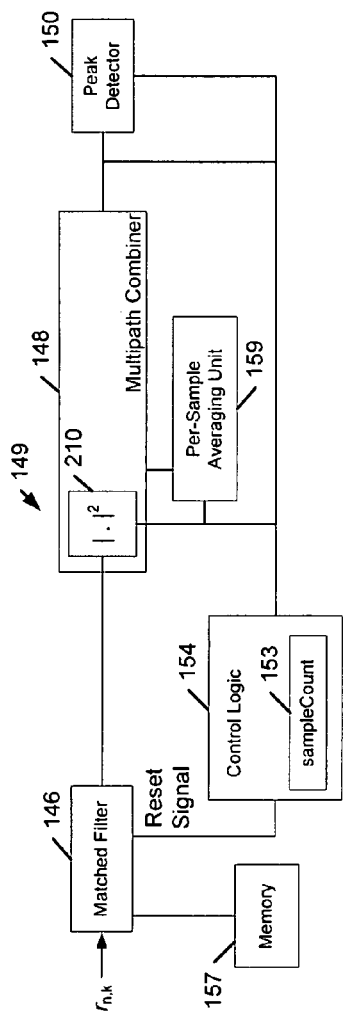
FIG. 13 illustrates a block diagram of a partial receiver chain according to an alternative embodiment of the invention.

FIG. 13 illustrates a block diagram of a partial receiver chain (or receive chain) according to an alternative embodiment of the invention. Receiver 149 of FIG. 13 performs fine symbol timing determination and fine channel length estimation. In an alternative embodiment, receiver 149 of FIG. 13 also performs the coarse symbol timing determination and coarse channel length estimation described herein as being performed during packet detection by receiver 140 of FIG. 3. In such an alternative embodiment, the fine symbol timing determination and (or) fine channel length estimation are (is) performed after the coarse symbol timing determination and (or) coarse channel length estimation are (is) performed.

In an alternative embodiment, receiver 140 of FIG. 3 perform the functions of receiver 149 of FIG. 13 and one of ordinary skill in the art would appreciate how receiver 140 of FIG. 3 would be modified, without undue experimentation, to perform the functions described in connection with the description of receiver 149 of FIG. 13. Furthermore, in an alternative embodiment, receiver 149 of FIG. 13 performs the functions of receiver 140 of FIG. 3 and one of ordinary skill in the art would appreciate how receiver 149 of FIG. 13 would be modified, without undue experimentation, to perform the functions described in connection with the description of receiver 140 of FIG. 3.

Receiver 140 of FIG. 13 includes matched filter (MF) 146 which receives signal samples, $r_{n,k}$ from an analog-to-digital converter (ADC) not shown, where n is an integer indicative of the symbol and k is the sample index that varies from 1 to 165. The signal samples are those of packet synchronization symbols that are received after packet detection. The output of MF 146 is provided to multipath combiner 148.

Figure 14:
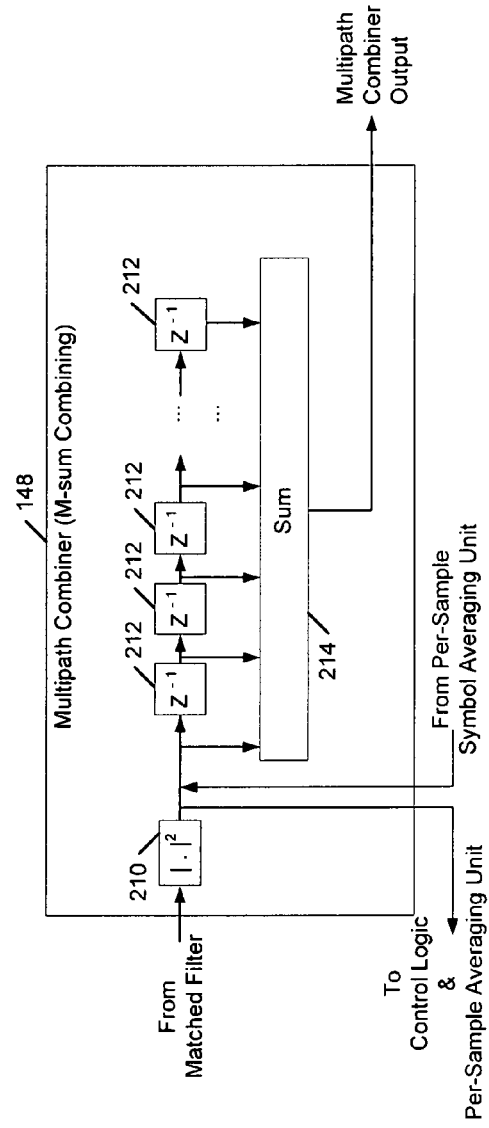
FIG. 14 illustrates a multipath combiner according to an alternative embodiment of the invention.

FIG. 14 illustrates a multipath combiner according to an alternative embodiment of the invention. The output of MF 146 is provided to PU 210 of MPC 148 of FIG. 14 which squares the amplitude of samples outputted by MF 146. The output of PU 210 is provided to per-sample averaging unit (PSAU) 159 and control logic 154. While in an embodiment PU 210 of MPC 148 is used to generate the square of the amplitude of the samples output by MF 146, one of ordinary skill in the art would appreciate how a separate amplitude squared unit could be used without undue experimentation in an alternative embodiment.

As indicated immediately above, the output of PU 210 is also provided to CL 154 which identifies the index of the peak sample in the output. CL 154 then performs successive interim fine timing adjustments based upon the index of the peak sample, peak sample index, associated with the symbols that are used in the fine timing and fine channel length estimation phase by adjusting the value in counter sampleCount 153. To make the adjustment, in an embodiment, CL 154 sets the value in sampleCount 153 to the current value in sampleCount 153—(peak sample index—128). If peak sample index is greater than 128, sampleCount 153 is delayed. If peak sample index is less than 128, sampleCount 153 is advanced. When sampleCount 153 resets to 1 after reaching 165, delay elements 170, 176 (which are shift registers that store received signal sample values) of MF 146 are flushed out (i.e., reset to 0) by a reset signal that is sent from CL 154. The flushing out of the delay elements is not performed in an alternative embodiment.

If the output of the matched filter is represented by $x_{n,k}$, the output of PU 210 is represented by $w_{n,k}=|x_{n,k}|^2$ where n is the symbol index and ranges from 1 to 6 in an embodiment, but other ranges are also possible in other alternative embodiments. In $w_{n,k}$ and $x_{n,k}$, k is the sample index and ranges from 1 to 165 in an embodiment (128 information symbol samples and 37 zero-padded suffix samples), but other ranges are possible in alternative embodiments.

PSAU 159 does per-sample averaging of PU 210 output for symbols received in each band and stores the average for each band for later provision to MPC 148. For example, in an embodiment, for the case where symbol 1 and symbol 4 are received in band 1, symbol 2 and symbol 5 are received in band 2, and symbol 3 and symbol 6 are received in band 3, the output of PU 210 for symbol 1 and symbol 4 is averaged by PSAU 159 on a per-sample basis and stored for later provision to MPC 148. The same is also done for the PU 210 output for symbol 2 and symbol 5, and symbol 3 and symbol 6. PSAU 159 stores the PU 210 output associated with symbol 1 until the PU 210 output associated with symbol 4 arrives and then performs the per-sample averaging and provides to MPC 148 the per sample average. In an alternative embodiment, the PU 210 output associated with 2 symbols in a band are stored in PSAU 159 until the PU 210 output for a third symbol in the same band arrives, thereby allowing PSAU 159 to perform a per-sample average for the output for 3 symbols received in a band.

While in an embodiment per sample averaging is performed for the output of PU 210, in an alternative embodiment, per sample averaging is performed for the output of MPC 148. In such an alternative embodiment, PSAU 159 is coupled to MPC 148.

Figure 15:
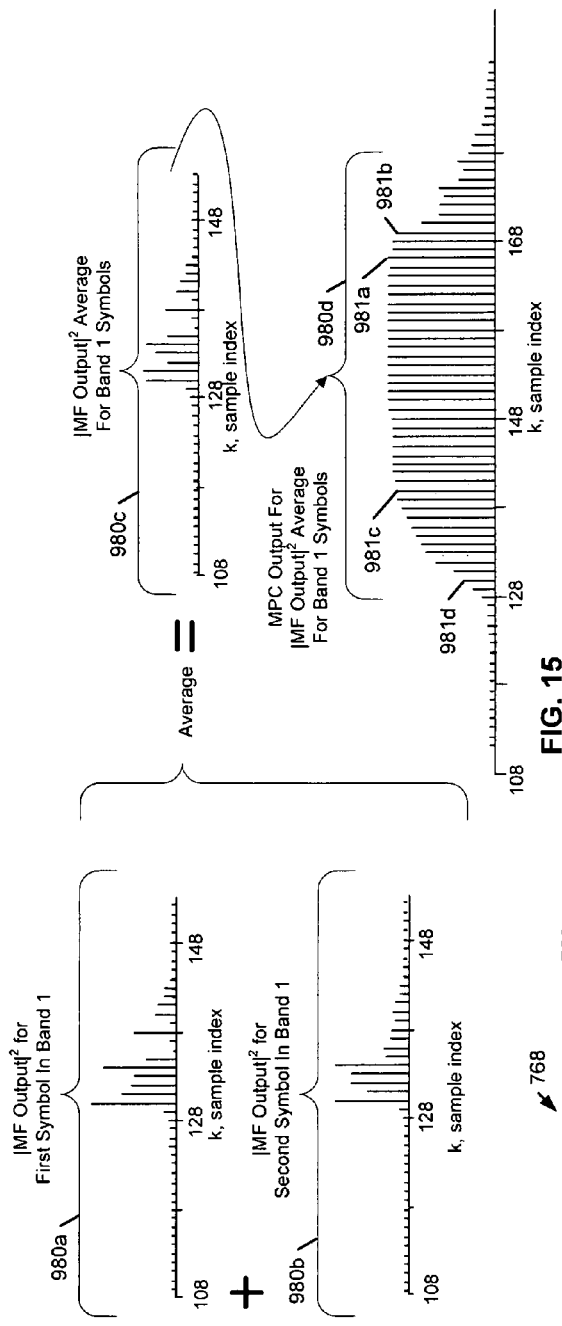
FIG. 15 illustrates operations related to fine symbol timing and fine channel length estimation according to an embodiment.

FIG. 15 illustrates operations related to fine symbol timing and fine channel length estimation according to an embodiment. The outputs presented in FIG. 15 are hypothetical outputs provided for purposes of illustration. In FIG. 15 the squared amplitude of the output of a matched filter due to a first symbol in band 1 980*a* is summed with the squared amplitude of a matched filter due to a second symbol in band 1 980*b* to produce 980*c* on a per-sample basis an average of the squared amplitude output of a matched filter due to symbols received in band 1. While only the PU 210 output associated with two symbols in a single band is illustrated, one of ordinary skill in the art would appreciate that the invention is not limited to averaging the PU 210 output of only two symbols, but that averaging the PU 210 output for more than 2 symbols is encompassed by the invention.

Furthermore, while only the PU 210 output for symbols received in a band, band 1, is averaged in the illustration of FIG. 15, PSAU 159 performs similar averaging for the PU 210 output for symbols received in other bands as well, and the invention is not limited to averaging the PU 210 output for symbols received in a single band. Reference to band 1 or any other similar reference is not intended to limit the invention to one particular band or the bands referred to by use of the labels '1', '2', '3' and so forth, but simply a label to facilitate illustration and description of the embodiments.

The per-sample average for band 1 produced by PSAU 159 is provided to MPC 148 which can be an alternative embodiment of MPC 148 of FIG. 5*a*, or, in an alternative embodiment, MPC 148 of FIG. 5*b*. One of ordinary skill in the art would appreciate how MPC 148 of FIGS. 5*a*, 5*b* can be modified without undue experimentation to provide the functionality of MPC 148 of FIG. 14. In an alternative embodiment, MPC 148 is referred to as a moving-average accumulator.

The per-sample average for band 2 and band 3 is subsequently provided to MPC 148 which produces an output per band, $z_k^b$, where k is the sample index and b is the band number. FIG. 15 illustrates the output 908*d* of MPC 148 that is associated with the PSAU 159 output associated with symbol 1 and symbol 4 which were received in band 1. The per band output of MPC 148 is provided to peak detector 150. Peak detector 150 identifies the peak sample with index $k_{max}$ and power $z_{max}$ in the per-band output of MPC 148.

For the case illustrated by FIG. 15, peak detector 150 determines that peak sample 981*a* has an index, $k_{max}$, of 166. Using the value of $k_{max}$ determined by PD 150, in an embodiment, CL 154, using the relations described elsewhere herein, determines indices $k_{fall}$ and $k_{tap1}$ which are associated with sample 981*b* and sample 981*d*, respectively. Since index $k_{tap1}$ is associated with band 1, it is referred to as idx_tap1_b1 where the suffix b1 indicates that the timing index $k_{tap1}$ is associated with band 1.

As is apparent from the description herein, the structure or shape of the output of a multipath combiner such as multipath combiner 148 affects the fine timing indices and the fine channel length estimates produced by CL 154.

For the case illustrated by FIG. 15, CL 154 also determines $k_{rise}$, the index that identifies sample 981*c*. In an embodiment, using $k_{rise}$ and $k_{tap1}$, CL 154 determines an estimate of the channel length, $L_{est}$ using the relation described elsewhere herein. Since the channel length estimate, $L_{est}$, is associated with band 1 it is referred to as chan_length_b1. The process described above for producing MPC 148 output for the PU 210 output of MF 146 is repeated for symbol 2 and symbol 5 that are received in band 2 to produce idx_tap1_b2 and chan_length_b2, and symbol 3 and symbol 6 that are received in band 3 to produce idx_tap1_b3 and chan_length_b3.

As indicated earlier, a TFC in which the coded information is interleaved over three (or more) bands, is referred to as Time-Frequency Interleaving (TFI); a TFC in which the coded information is interleaved over two bands, is referred to as two-band TFI or TFI2; and a TFC in which the coded information is transmitted on a single band, is referred to as Fixed Frequency Interleaving (FFI).

In an embodiment, for three band TFI, a final timing index, idx_tap1_final is generated based upon idx_tap1_b1, idx_tap1_b2, and idx_tap1_b3 using the following relation: idx_tap1_final=median{idx_tap1_b1, idx_tap1_b2, idx_tap1_b3}−fft_place_adv, where fft_place_adv is offset for any bias in the process and can be derived from simulations or experiments without undue experimentation. In an embodiment, M is set to 40, $p_{rise}$ and $p_{fall}$ are each set to 0.9, fft_place_adv is set to 5, but other values are possible and can be selectively chosen by an embodiment.

In an embodiment, for TFI2, a final timing index, idx_tap1_final is generated based upon idx_tap1_b1, and idx_tap1_b2 using the following relation: idx_tap1_final=floor(mean{idx_tap1_b1, idx_tap1_b2}−fft_place_adv. In an embodiment, for FFI, a final timing index, idx_tap1_final is generated based upon idx_tap1_b1 using the following relation: idx_tap1_final=idx_tap1_b1−fft_place_adv.

The invention is not limited to foregoing relations for determining idx_tap1_final and one of ordinary skill in the art would appreciate that there are many other possible relations including: idx_tap1_final=min{idx_tap1_b1 . . . idx_tap1_bn}−fft_place_adv, where idx_tap1_bn is the timing index for band n and n is greater than or equal to 2; and idx_tap1_final=mean{idx_tap1_b1 . . . idx_tap1_bn}−fft_place_adv.

In an alternative embodiment, to determine the final timing index, CL 154 also applies the following relations in order to limit the range for the final timing index. First, if idx_tap1_final<128−tbd1, idx_tap1_final=128−tbd1, where tbd1=20, but other values for tbd1 are possible in alternative embodiments. Second, if idx_tap1_final>128+tbd2, idx_tap1_final=128+tbd2, where tbd2=20 but other values for tbd2 are possible in alternative embodiments.

In an embodiment, after determining idx_tap1_final, CL 154 adjusts counter sampleCount 153 such that subsequent values for $k_{tap1}$ are very likely to occur when sampleCount 153 stores the value of 128. To make the adjustment, in an embodiment, CL 154 sets the value in sampleCount 153 to the current value in sampleCount 153—(idx_tap1_final—128). If idx_tap1_final is greater than 128 sampleCount 153 is delayed and if idx_tap1_final is less than 128 sampleCount 153 is advanced. Composite timing index is another label used herein for referring to idx_tap1_final.

In an embodiment, CL 154 also generates a fine channel length estimate. In an embodiment, for three band TFI, a fine channel length estimate, fine_chan_length is generated based upon chan_length_b1, chan_length_b2, and chan_length b3 using the following relation: fine_chan_length=median{chan_length_b1, chan_length_b2, chan_length_b3}.

In an embodiment, for TFI2, a refined channel length estimate, fine_chan_length is generated based upon chan_length_b1, and chan_length_b2 using the following relation: fine_chan_length=floor(mean{chan_length_b1, chan_length_b2}).

The invention is not limited to the foregoing relations for determining fine_chan_length and one of ordinary skill in the art would appreciate that there are many other possible relations including: fine_chan_length=min{chan_length_b1 . . . chan_length_bn}, where chan_length_bn is the channel length estimate for band n and n is greater than or equal to 2; fine_chan_length=max{chan_length_b1 . . . chan_length_bn}; or fine_chan_length=mean{chan_length_b1 . . . chan_length_bn}. Composite channel length estimate is another label used herein for referring to fine_channel_length.

One of ordinary skill in the art would appreciate that the invention is not limited to performing both fine timing estimation and fine channel length estimation. An alternative embodiment performs fine timing estimation and does not perform fine channel length estimation while yet another alternative embodiment performs fine timing estimation and selectively performs fine channel length estimation. Other alternative embodiments are also possible and are encompassed by the invention. Depending upon the embodiment, fine timing estimation may include timing adjustment such as described elsewhere herein.

Figure 16E:
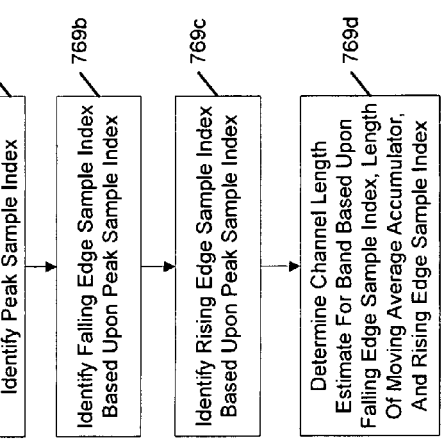
FIG. 16e illustrates in greater detail the operation for determining on a per band basis a channel length estimate of FIG. 16d according to an embodiment of the invention.
Figure 16A:
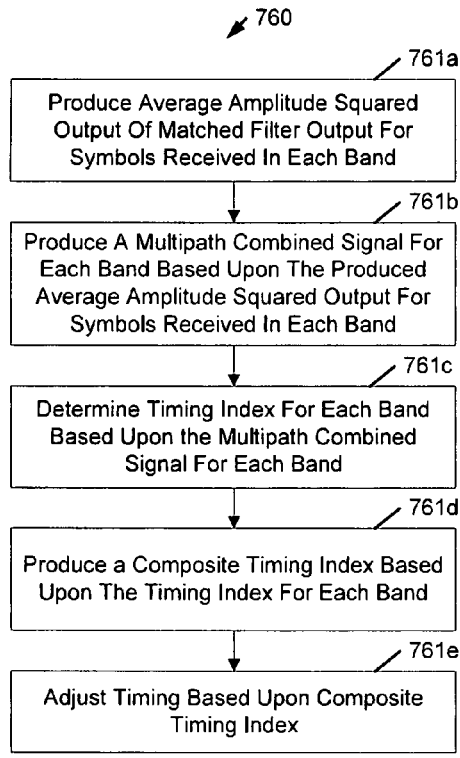
FIG. 16a illustrates a process for making a fine timing adjustment according to an embodiment of the invention.

FIG. 16*a* illustrates a process for making a fine timing adjustment according to an embodiment of the invention. While process 760 is described herein without reference to the units of receiver 140 of either of FIG. 3 or 13, one of ordinary skill in the art would appreciate how—given the description provided herein of receiver 140 of FIG. 13—to make and use, without undue experimentation, embodiments that perform process 760 or one of its alternatives.

Process 760 includes, for a TFC, producing 761*a* for the amplitude squared output of the matched filter output for symbols received in certain bands of the TFC, an average amplitude squared output on a per band basis. While in an embodiment, the average amplitude squared output is generated for each band of the TFC, in an alternative embodiment, the average amplitude squared output is generated for less than all of the bands of the TFC.

Process 760 includes producing 761*b*, on a per band basis, a multipath combined signal, based upon the produced average amplitude squared output. While in an embodiment, a multipath combined signal is generate for each band of the TFC, in an alternative embodiment, a multipath combined signal is not generated for each band of the TFC. A timing index is generated 761*c* on a per band basis based upon the multipath combined signal associated with the band. Again, in an embodiment, a timing index is not generated for each band of the TFC, while a timing index is generated for each band of the TFC in an alternative embodiment. A composite timing index is generated 761*d* based upon each timing index generated. Timing is adjusted 761*e* based upon the composite timing index.

Figure 16B:
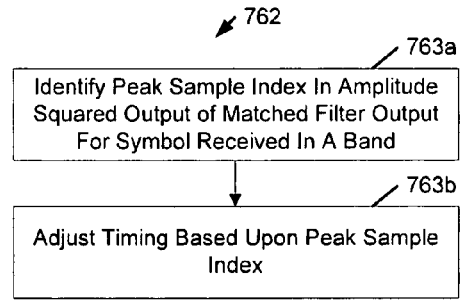
FIG. 16b illustrates a process for making interim timing adjustments according to an embodiment of the invention.

FIG. 16*b* illustrates a process for making interim timing adjustments according to an embodiment of the invention. An alternative embodiment of process 760 includes process 762. In such an alternative embodiment, process 762 is part of operation 761*a* of producing an average amplitude squared output on a per band basis. To produce, on a per band basis, an averaged amplitude squared output for the matched filter output of symbols received in a band, amplitude squared output is generated on a per symbol basis. Based upon the amplitude squared output generated on a per symbol basis, process 762 includes identifying 763*a* the peak sample index for the peak sample in the amplitude squared output generated on a per symbol basis. Timing is then adjusted 763*b* based upon the peak sample index.

Figure 16C:
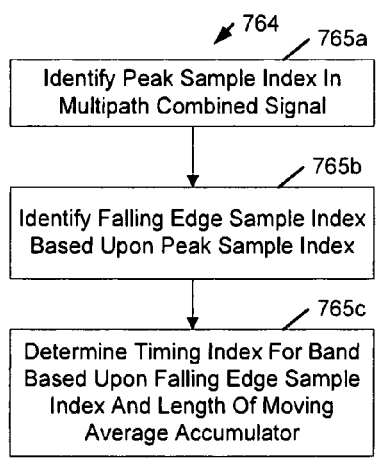
FIG. 16c illustrates in greater detail the operation for determining on a per band basis a timing index of the process of FIG. 16a according to an embodiment of the invention.

FIG. 16*c* illustrates in greater detail the operation for determining on a per band basis a timing index of the process of FIG. 16*a* according to an embodiment of the invention. In process 764, the peak sample index of the peak sample in the multipath combined signal for a band is identified 765*a*. A falling edge sample index is identified 765*b* based upon the peak sample index. A timing index is determined 765*c* based upon the falling edge sample index and the length of MPC 148.

Figure 16D:
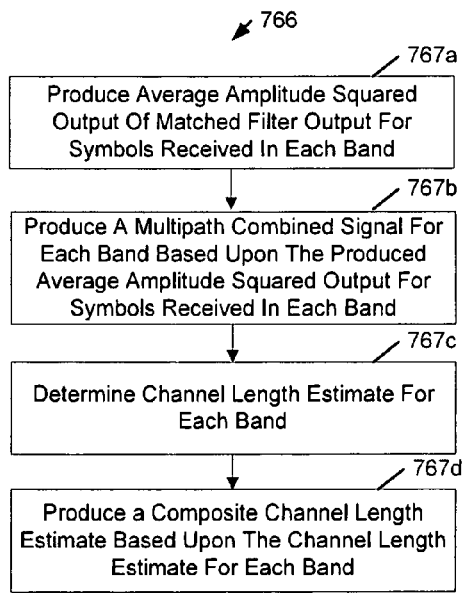
FIG. 16d illustrates a process for making a fine channel length estimate according to an embodiment of the invention.

FIG. 16*d* illustrates a process for making a fine channel length estimate according to an embodiment of the invention. While process 766 is described without reference to the units of receiver 140 of either of FIG. 3 or 13, one of ordinary skill in the art would appreciate how—given the description provided herein of receiver 140 of FIG. 13—to make and use, without undue experimentation, embodiments that perform process 766 or one of its alternatives. Furthermore, process 760 includes process 766 according to an alternative embodiment.

Process 766 includes, for a certain TFC, producing 767*a* for the matched filter output for symbols received in certain bands of the TFC, an average amplitude squared output on a per band basis. While in an embodiment, the average amplitude squared output is generated for each band of the TFC, in an alternative embodiment, the average amplitude squared output is generated for less than all of the bands of the TFC.

Process 766 includes producing 767*b*, on a per band basis, a multipath combined signal, based upon the produced average amplitude squared output. While in an embodiment, a multipath combined signal is generated for each band of the TFC, in an alternative embodiment, a multipath combined signal is not generated for each band of the TFC. A channel length estimate is generated 767*c* on a per band basis based upon the multipath combined signal associated with the band. Again, in an embodiment, a channel length estimate is not generated for each band of the TFC, while a channel length estimate is generated for each band of the TFC in an alternative embodiment. A composite channel length estimate is generated 767*d* based upon each channel length estimate generated. In an alternative embodiment, the composite channel length estimate is used in an alternative embodiment of process 950 described in connection with FIG. 12*c*.

FIG. 16*e* illustrates in greater detail the operation for determining on a per band basis a channel length estimate of FIG. 16*d* according to an embodiment of the invention. In process 768, the peak sample index of the peak sample in the multipath combined signal for a band is identified 769*a*. A falling edge sample index is identified 769*b* based upon the peak sample index. A rising edge sample index is determined 769*c* based upon the peak sample index. A channel length estimate is determined based upon the falling edge sample index, the rising edge sample index, and the length of the moving average accumulator.

While the processes of FIGS. 16*a*, 16*b*, 16*c*, 16*d*, 16*e* are shown with operations that appear to occur sequentially in the sense that one operation is finished before another commences, one of ordinary skill in the art would appreciate that at least some of the operations happen concurrently in that their execution overlaps. For example in FIG. 16*a*, production of a squared amplitude output for the matched filter output of a symbol 761*a* received in band 2 can occur while a multipath combined signal for the average squared amplitude output for the matched filter for symbols received in band 1 is being produced 761*b*.

Figure 17:
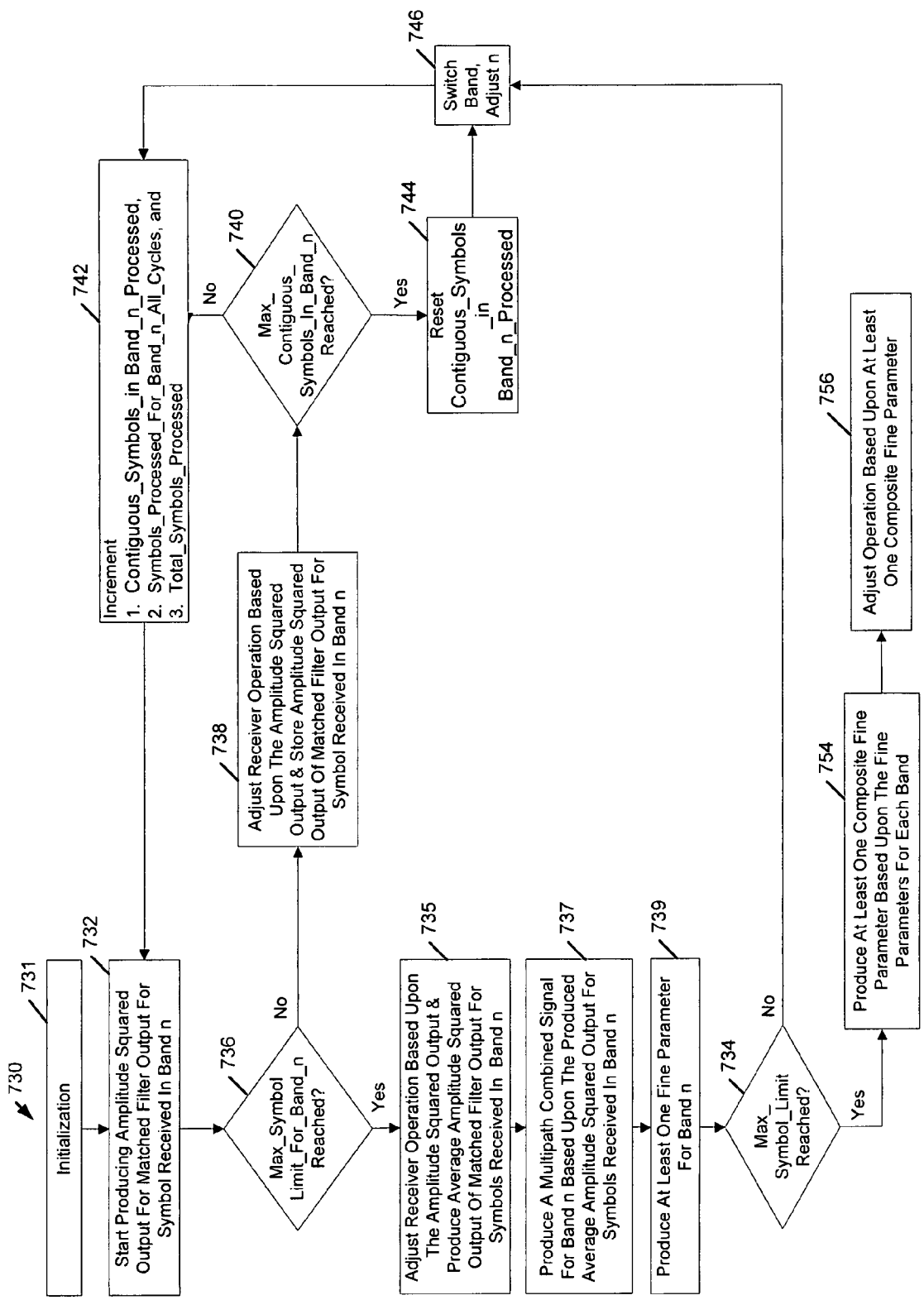
FIG. 17 illustrates a process involving at least one fine parameter determination according to an embodiment.

FIG. 17 illustrates a process involving at least one fine parameter determination according to an embodiment. In an embodiment, process 730 uses the at least one fine parameter determined to adjust the operation of a receiver, but in an alternative embodiment the at least one fine parameter is used for another purpose. In an embodiment, a fine parameter determined by process 730 is a fine timing index for adjusting the symbol timing of a receiver. In an alternative embodiment, a fine parameter determined by process 730 is a fine channel length estimate. In yet another alternative embodiment, a fine timing index and a fine channel length estimate are among the fine parameters determined by process 730.

While process 730 is described herein without reference to the units of receiver 140 of either of FIG. 3 or 13, one of ordinary skill in the art would appreciate how—given the description provided herein of receiver 140 of FIG. 13—to make and use, without undue experimentation, embodiments that perform process 730 or one of its alternatives. One of ordinary skill in the art would appreciate that the logic (e.g., operations, flow, control values, etc. . . . ) of process 730 depends upon the TFC or TFCs for whose symbols a fine parameter determination is made. Consequently, in an alternative embodiment, process 730 may have different logic. However, one of ordinary skill in the art would appreciate how to make and use alternative embodiments without undue experimentation given the description provided herein.

For example, process 730 can handle a TFC with the following pattern $\{1, 1, 2, 2, 3, 3\}$. However, not every embodiment must include a process 730 that can handle such a TFC.

In process 730, several counters and limits are initialized 731 based upon the characteristics of a TFC (e.g., particular bands in the TFC, number of bands, number of symbols in a band in one cycle of the TFC, etc. . . . ) for which at least one fine parameter is to be determined. In an embodiment, the TFC is the one that was used during an earlier packet detection phase that successfully detected that packet reception is occurring. In an alternative embodiment, the TFC may be one that is specified as a default TFC and need not be identified during an earlier packet detection phase.

The following counters are initialized 731: Contiguous_Symbols_in Band_n_Processed (CSIBnP)=1, Symbols_Processed_For_Band_n_μl_Cycles (SPFBnAC)=1, and Total_Symbols_Processed (TSP)=1, where n is an integer greater than 1 and uniquely identifies a TFC band. The number of unique bands in a TFC is N. In an embodiment, there are multiple SPFBnAC counters, one for each band for which processing is made. There may be N CSIBnP counters in an embodiment, but an alternative embodiment may have fewer than N counters or no counters.

Process 730 is described in terms of handling symbols for a TFC with the following pattern $\{1, 1, 2, 2, 3, 3\}$. The following limits are set 731: Max_Symbol_Limit (MSL)=total number of symbols in p TFC cycle(s), where p is an integer greater than or equal to 1 and is selectively set as part of initialization 731; Max_Symbol Limit_Band_n (MaSLBn)= total number of symbols that will be processed in band n in p TFC cycle(s); and Max_Contiguous_Symbols_In_Band_n (MaCSIBn)=number of contiguous symbols in band n. For purposes of illustration only for the case of the TFC with pattern $\{1, 1, 2, 2, 3, 3\}$ and p is 1, MaCSIBn is set to 2, MaSLBn is set to 2 (but is generally 2*p for TFC $\{1, 1, 2, 2, 3, 3\}$), and MSL is set to 6 (but is generally 6*p for TFC $\{1, 1, 2, 2, 3, 3,\}$.

While process 730 is described in terms of handling symbols for a TFC with the following pattern $\{1, 1, 2, 2, 3, 3\}$ for the case where p is 1, one of ordinary skill in the art would appreciate how process 730 would handle the symbols for values of p other than 1 or handle the symbols for another TFC (or TFCs), and how, if necessary, to modify process 730 without undue experimentation to handle symbols for other TFCs. Furthermore, while in an embodiment process 730 is described as starting processing with the first symbol in the first band of the TFC (e.g., first symbol in band 1), the invention is not limited to processes that start with the first symbol in the first band but encompasses processes that start with the symbol of a band other than the first band (e.g., for illustrative purposes only, the fourth symbol in band 2 for a TFC with pattern $\{1, 1, 2, 2, 3, 3\}$ or the third symbol in band 3 for a TFC with pattern $\{1, 2, 3, 1, 2, 3\}$).

For purposes of illustration, process 730 starts with a receiver tuned to receive symbol 1 in band 1, hence n is 1. Continuing with process 730, amplitude squared output is produced 732 for the matched filter output for a symbol received in band n. Process 730 determines 736 whether MaSLBn has been reached by comparing the value of SPFBnAC to MaSLBn. When MaSLBn has not been reached, in an embodiment, receiver operation is adjusted 738 based upon the amplitude squared output and the amplitude squared output is stored for later retrieval and averaging. In an alternative embodiment, receiver operation is not adjusted in operation 738. In an embodiment, the adjustment includes performing an interim fine timing adjustment such as the one described in connection with the description of FIG. 16*b*.

Process 730 then determines 740 whether MaCSIBn has been reached by comparing the value in CSIBnP to MaCSIBn. When MaCSIBn has not been reached, the counters—CSIBnP, SPFBnAC, and TSP—are incremented 742. For the matched filter output for the next symbol in band n, an amplitude squared output is produced 732.

When MaCSIBn has been reached, CSIBnP is reset 744, 1) the band to which the receiver is tuned is switched 746, and 2) n is set 746 to identify the new band, in accordance with the TFC that is controlling the operation of process 730. The counters CSIBnP, SPFBnAC, and TSP are incremented 742 and the for the matched filter output for a symbol—received in the new band to which the receiver is switched—an amplitude squared output is produced 732.

When MaSLBn has been reached, in an embodiment, receiver operation is adjusted 735 based upon the amplitude squared output 732 and an average amplitude squared output is produced based on 1) the previously stored amplitude squared output(s) for symbols received in band n and 2) the amplitude squared output produced 732 for the symbol being received in band n. In an embodiment, the operation of producing amplitude squared output 732 overlaps with the operation of producing 735 an average amplitude squared output. In an alternative embodiment, operations 732 and 735 are not performed concurrently.

In an alternative embodiment, receiver operation is not adjusted in operation 735. In an embodiment, the adjustment includes performing an interim fine timing adjustment such as the one described in connection with the description of FIG. 16b. A multipath combined signal for the band based upon the produced average amplitude squared output for symbols received in the band is then produced 737. Based upon the produced multipath combined signal at least one fine parameter for the band is produced 739. In an embodiment, the at least one fine parameter is stored 739 for later retrieval and use in generating at least one composite fine parameter. Depending upon the embodiment, the at least one fine parameter is one or more of the following: a band timing index such as idx_tap1_bn—described elsewhere herein—, the timing index for band n, where n is greater than or equal to 1; and a channel length estimate such as chan_length_bn—described elsewhere herein—is the channel length estimate for band n, where n is greater than or equal to 1.

Process 730 then determines 734 whether MSL has been reached by comparing the value of TSP to MSL. When MSL has not been reached, process 730 returns to perform operation 746. When MSL has been reached, at least one composite fine parameter is produced 754 based upon the at least one fine parameters previously stored. In an embodiment, operation of the receiver is adjusted based upon the at least one composite fine parameter 756. Depending upon the embodiment, the at least one composite fine parameter is one or more of the following: idx_tap1_final, the composite fine timing index; or fine_chan_length, the composite fine channel length estimate.

While at least one embodiment has been described as involving the amplitude squared of the output of a matched filter, in at least one alternative embodiment, the amplitude of the matched filter output is not squared. In such an alternative embodiment, PU 210 is unnecessary and MPC 148 uses the amplitude of the matched filter output.

Although the mechanisms for packet detection, timing acquisition and adjustment, channel length estimation and channel response estimation of the invention can be incorporated in numerous types of wireless or wired communication devices such a multimedia player, cellular phone, PDA, DSL modem, WPAN device, etc., embodiments are described in the context of a MBOA-UWB (i.e. WiMedia standard) based communication device. It is not intended, however, that the invention will be limited to the example applications and embodiments presented. It is appreciated that one skilled in the art can apply the principles of the present invention to many other types of communication systems well-known in the art without departing from the spirit and scope of the invention. In addition, the principles of the invention can be applied to other wireless or wired standards and is applicable wherever there is a need to perform packet detection over multipath plagued channels.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.) or sharing audio, video, and/or pictures with another multimedia device or storage device. The user input means is typically formed of one or more manually operated switches, buttons, wheels or other user input means. Examples of multimedia devices include pocket sized personal digital assistants (PDAs), car radios, notebook computer, DVD or compact disc players, digital video recorders (DVRs), personal media player/recorders, cellular telephones, handheld devices, and the like. In some instances, devices 111a, 111b are multimedia players that include one or more embodiments of the invention.

Some portions of the detailed description are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

In the preceding specification, the invention has been described with reference to specific exemplary embodiments of the invention. It will, however, be evident to one of ordinary skill in the art that various modifications and changes may be made without departing from the broader spirit and scope of the invention as set forth in the claims that follow. The specification and drawings are accordingly to be regarded in an illustrative rather than restrictive sense. Embodiments can be expressed as—and are not limited to—components, processes, systems, articles of manufacture, compositions of matter, and apparatus with some, all, or a fraction of the features described herein.

What is claimed is:

1. An apparatus for robust packet detection in a packet-based wireless system, the apparatus comprising:
    a matched filter that is to produce at least one match indication indicative of a match between at least one signal received in at least one band and a reference signal, the at least one signal includes a first signal and a second signal, and the at least one band includes a first band and a second band;
    a multipath combiner that is to produce at least one multipath combined signal based upon the at least one match indication;
    wherein the at least one match indication includes a first match indication based on the first signal received in the first band and a second signal indication based on the second signal received in the second band, the least one multipath combined signal includes a first multipath combined signal and a second multipath combined signal, the first multipath combined based upon the first match indication, the second multipath combined signal based upon the second match indication;
    memory that is to store the first multipath combined signal;
    a per sample averaging unit that is to produce an average multipath combined signal based upon a per sample average of the first multipath combined signal and the second multipath combined signal; and
    a peak detector that is to identify a first peak in the average multipath combined signal to determine whether a packet reception is occurring.

2. The apparatus of claim 1, wherein the matched filter is a single-stage matched filter comprising an array of multipliers that stores values for a reference signal.

3. The apparatus of claim 1, wherein, the matched filter is a two-stage matched filter comprising a first array of multipliers that stores values for a base sequence and a second array of multipliers that stores values for a spreading sequence.

4. The apparatus of claim 1, wherein the multipath combiner comprises an M-tap delay line and a summer, and is to pass samples of the first signal match indication through the M-tap delay line to produce M-tap outputs for the summer to add to produce the first signal multipath combined signal, wherein M is an integer.

5. The apparatus of claim 1, wherein the multipath combiner comprises an M-tap delay line, a largest K of M selector, and a summer, and is to pass samples of the first signal match indication through the M-tap delay line to produce M-tap outputs, the largest K of M selector is to select the K largest values of the M-tap outputs for the summer to add to produce the first signal multipath combined signal, wherein K and M are integers and K is less than M.

6. The apparatus of claim 1, further comprising a control logic that is to set a rising threshold (rise_th), a falling threshold (fall_th) and a multipath combining threshold (mpc_th) based upon channel conditions for the peak detector to use to detect the first peak.

7. The apparatus of claim 1, wherein the first peak has an associated first peak power and the peak detector is to determine whether the first peak power exceeds a first threshold.

8. The apparatus of claim 7, wherein, as a consequence of determining that the first peak power exceeds a first threshold, a multiband combiner is to determine that the packet reception is occurring.

9. The apparatus of claim 8, wherein the first peak has a first peak sample index, further comprising control logic that is to determine a timing index based upon the first peak sample index; and is to adjust timing based upon the timing index.

10. The apparatus of claim 8, wherein the first peak has an associated first peak sample index, further comprising control logic that is to determine a timestamp based upon the first peak sample index.

11. The apparatus of claim 10, wherein the control logic is to determine, based upon the determined timestamp, a starting sample index for samples of a symbol for which an FFT is to be performed.

12. The apparatus of claim 1, wherein the apparatus comprises an ultra-wide band frequency hopping receiver.

13. The apparatus of claim 1, wherein the apparatus comprises a multimedia device.

14. The apparatus of claim 1, further comprising, control logic that is to identify in the first multipath combined signal a sample indicative of a falling edge, the sample having an associated falling edge index; is to determine a timestamp based upon the falling edge index and a length of the multipath combiner that produced the first multipath combined signal, is to determine a rising edge index based upon the timestamp, and is to determine a channel length estimate based upon the timestamp and the rising edge index.

15. The apparatus of claim 14, wherein the first peak has an associated first peak power, and the peak detector is to determine whether the first peak power exceeds a first threshold.

16. The apparatus of claim 15, wherein the control logic identifies the sample indicative of a falling edge when the first peak power exceeds a first threshold.

17. The apparatus of claim 14, wherein the control logic is to set for an overlap-and-add unit an overlap-and-add length based upon the channel length estimate.

18. The apparatus of claim 14, wherein the control logic is to select, based upon the channel length estimate, a filter representation for generating a filtered channel response estimate.

19. The apparatus of claim 18, further comprising a channel response estimate filter unit coupled to the control logic and that is to generate the filtered channel response estimate using the selected filter representation and samples of at least one channel estimation symbol.

20. The apparatus of claim 19, wherein the control logic is to also select the filter based upon a signal-to-noise ratio estimate.

21. The apparatus of claim 20, wherein the first multiplier is coupled to the first matched filter and the first multipath combiner and the first weight is applied to samples in the first signal first receive chain match indication to produce a weighted first signal first receive chain match indication for provision to the first multipath combiner.

22. The apparatus of claim 1, wherein the first band is the same as the second band.

* * * * *